United States Patent
Jeong et al.

(10) Patent No.: US 10,275,634 B2
(45) Date of Patent: Apr. 30, 2019

(54) ULTRASONIC FINGERPRINT SENSOR WITH ACOUSTIC SHIELDING

(71) Applicant: QUALCOMM Incorporated, San Diego, CA (US)

(72) Inventors: Seong Heon Jeong, San Diego, CA (US); Jong Soo Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/461,310

(22) Filed: Mar. 16, 2017

(65) Prior Publication Data

US 2018/0268187 A1    Sep. 20, 2018

(51) Int. Cl.
*G06K 9/20*    (2006.01)
*G06K 9/00*    (2006.01)

(52) U.S. Cl.
CPC ......... *G06K 9/0002* (2013.01); *G06K 9/0008* (2013.01)

(58) Field of Classification Search
CPC .. G06K 9/0002; A61B 8/4483–8/4494; G10K 11/002; G10K 11/168
See application file for complete search history.

(56) References Cited

U.S. PATENT DOCUMENTS

| | | | |
|---|---|---|---|
| 7,489,066 B2 | 2/2009 | Scott et al. | |
| 8,316,518 B2 | 11/2012 | Lukacs et al. | |
| 8,556,030 B2* | 10/2013 | Oakley | A61B 8/4281 181/284 |
| 2014/0027199 A1* | 1/2014 | Claeys | G10K 11/172 181/290 |
| 2014/0352440 A1* | 12/2014 | Fennell | G01N 29/22 73/632 |
| 2014/0355387 A1 | 12/2014 | Kitchens et al. | |
| 2015/0173712 A1* | 6/2015 | Song | A61B 8/4444 600/459 |
| 2015/0241393 A1 | 8/2015 | Ganti et al. | |
| 2016/0007961 A1 | 1/2016 | Lee et al. | |

* cited by examiner

*Primary Examiner* — Brian Werner
(74) *Attorney, Agent, or Firm* — Weaver Austin Villeneuve & Sampson LLP

(57) ABSTRACT

Disclosed are methods, devices, apparatuses, and systems for ultrasonic fingerprint sensing with an acoustic shielding structure. One or more layers in an ultrasonic fingerprint sensing system may reflect back ultrasonic waves due to acoustic impedance mismatch that can distort a fingerprint image. An acoustic shielding structure may be configured to absorb, store, trap, or otherwise attenuate ultrasonic waves. The acoustic shielding structure may be positioned underlying an ultrasonic sensor layer. In some implementations, the acoustic shielding structure may include a plurality of periodically spaced apart geometric features or holes in a medium.

14 Claims, 17 Drawing Sheets

ULTRASONIC FINGERPRINT SENSOR WITH ACOUSTIC SHIELDING

TECHNICAL FIELD

This disclosure relates generally to ultrasonic fingerprint sensor systems and, more particularly, to ultrasonic fingerprint sensor systems with acoustic shielding to limit back scattering.

DESCRIPTION OF RELATED TECHNOLOGY

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

SUMMARY

The devices, systems, and methods of this disclosure each have several aspects, no single one of which is solely responsible for the desirable attributes disclosed herein.

One aspect of the subject matter of this disclosure can be implemented in an apparatus. The apparatus includes an ultrasonic sensor layer, an ultrasonic transmitter layer over the ultrasonic sensor layer and having a piezoelectric material configured to generate ultrasonic waves, and a backing layer underlying the ultrasonic sensor layer, where the backing layer includes a material with an acoustic impedance different than the ultrasonic sensor layer. The apparatus further includes an acoustic attenuator layer between the ultrasonic sensor layer and the backing layer, where the acoustic attenuator layer includes a plurality of features periodically spaced apart in a medium.

In some implementations, each of the features includes one or both of a solid vertical component and a solid horizontal component. In some implementations, the plurality of features consists of a plurality of periodically spaced apart solid vertical components, each of the solid vertical components being discontinuous across a thickness of the acoustic attenuator layer. In some implementations, the plurality of features includes a plurality of periodically spaced apart solid vertical components and solid horizontal components, each of the solid vertical components being discontinuous across a thickness of the acoustic attenuator layer. The plurality of features are periodically spaced apart by a distance between a quarter-wavelength and a half-wavelength of the ultrasonic waves. In some implementations, the medium includes at least one of a metal, ceramic, plastic, and air, the medium having an acoustic impedance different than the plurality of features. The acoustic attenuator layer is configured to absorb or at least attenuate ultrasonic waves.

Another innovative aspect of the subject matter described in this disclosure can be implemented in an apparatus. The apparatus includes an ultrasonic sensor layer, an ultrasonic transmitter layer over the ultrasonic sensor layer and having a piezoelectric material configured to generate ultrasonic waves, and a backing layer underlying the ultrasonic sensor layer, where the backing layer includes a material with an acoustic impedance different than the ultrasonic sensor layer. The apparatus further includes an acoustic attenuator layer between the ultrasonic fingerprint sensor layer and the backing layer, where the acoustic attenuator layer includes one or more plates each with a plurality of periodically spaced apart holes.

In some implementations, the holes are periodically spaced apart by a distance between a quarter-wavelength and a half-wavelength of the ultrasonic waves. In some implementations, the one or more plates are in a medium of air, where the medium of air separates the one or more plates from one or both of the backing layer and the ultrasonic sensor layer. In some implementations, the acoustic attenuator layer is configured to absorb or at least attenuate ultrasonic waves. In some implementations, a thickness of the acoustic attenuator layer is between about 50 µm and about 500 µm.

Another innovative aspect of the subject matter described in this disclosure can be implemented in a mobile device. The mobile device includes a platen and an ultrasonic fingerprint sensing system underlying the platen. The ultrasonic fingerprint sensing system includes an ultrasonic transmitter layer including a piezoelectric material configured to generate ultrasonic waves, an ultrasonic sensor layer underlying the ultrasonic transmitter layer, and an acoustic attenuator layer underlying the ultrasonic sensor layer. The acoustic attenuator layer includes: (1) a plurality of periodically spaced apart features in a medium or (2) one or more plates each with a plurality of periodically spaced apart holes.

In some implementations, the ultrasonic fingerprint sensing system further includes a backing layer underlying the acoustic attenuator layer, where the backing includes a material with an acoustic impedance different than the ultrasonic sensor layer. In some implementations, the acoustic attenuator layer is configured to absorb or at least attenuate ultrasonic waves.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
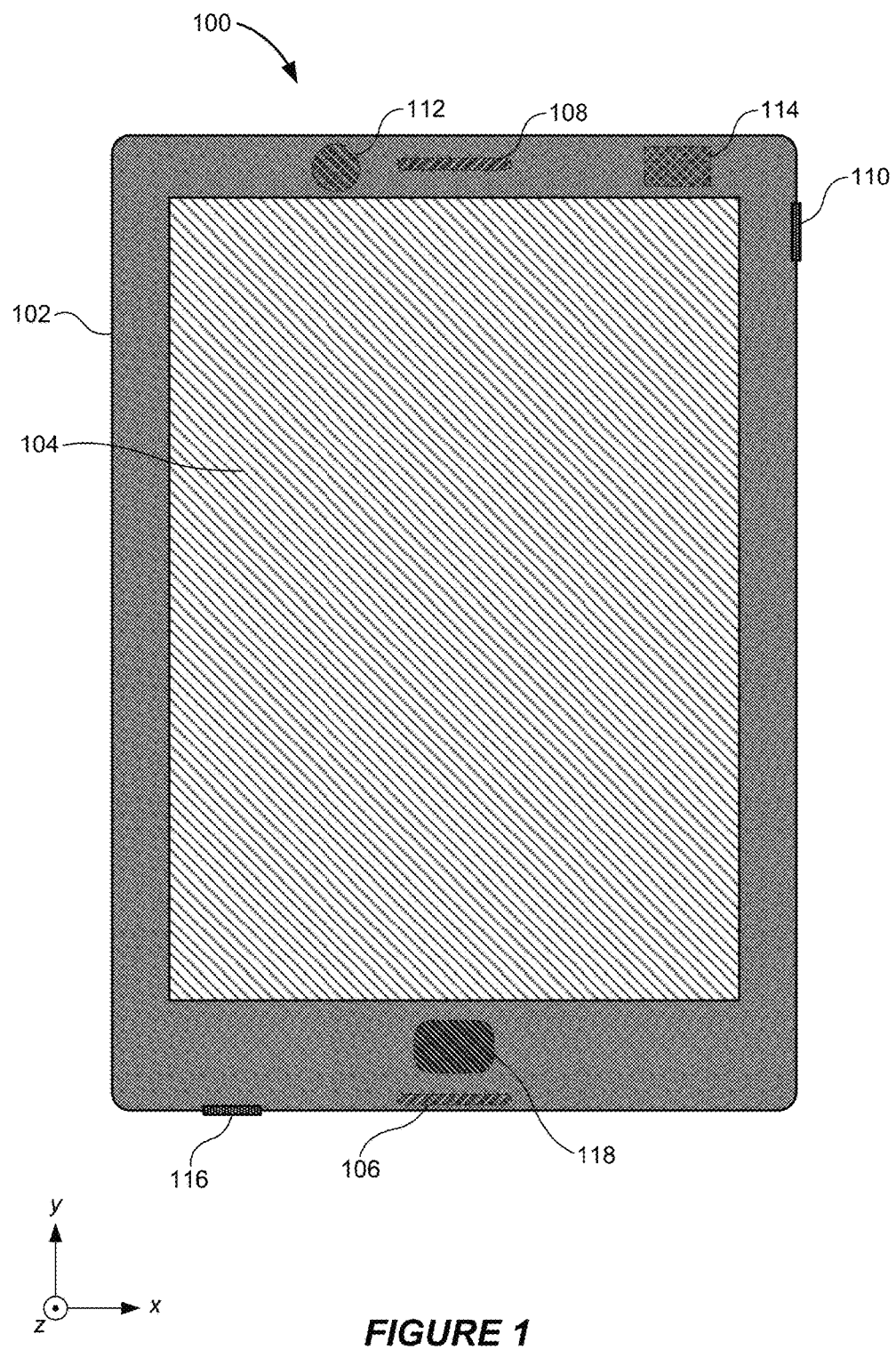
FIG. 1 shows a front view of a diagrammatic representation of an example mobile device that includes an ultrasonic sensing system according to some implementations.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The present disclosure relates generally to an ultrasonic fingerprint sensing system with an acoustic shielding structure or acoustic attenuator configured to absorb, store, trap, or otherwise attenuate acoustic waves, including ultrasonic waves. The ultrasonic fingerprint sensing system includes an ultrasonic sensor layer or ultrasonic receiver layer, and an ultrasonic transmitter layer configured to generate ultrasonic waves. An acoustic attenuator is positioned behind or below the ultrasonic sensor layer to limit back scattering of ultrasonic waves. In other words, the acoustic attenuator limits backward-propagating ultrasonic waves from being reflected back towards a finger and the ultrasonic transmitter layer, which can ultimately distort a fingerprint image. In some implementations, the acoustic attenuator is positioned between a backing layer and the ultrasonic sensor layer. In some implementations, the acoustic attenuator includes a plurality of periodically spaced apart geometric features or holes in a medium to absorb, store, trap, or otherwise attenuate ultrasonic waves. The plurality of geometric features or holes may be periodically spaced apart by a distance between a quarter-wavelength and a half-wavelength of the ultrasonic wave. In some implementations, the acoustic attenuator includes a bulk inhomogeneous material. In some implementations, the acoustic attenuator includes a plurality of sublayers of different materials.

Particular implementations of the subject matter described in this disclosure can be implemented to realize one or more of the following potential advantages. The acoustic attenuator absorbs acoustic energy so as to prevent or otherwise limit acoustic reflections that would distort an ultrasonic fingerprint image. This allows an ultrasonic fingerprinting module to be placed anywhere on an electronic device, even over a rigid printed circuit board (PCB) or mechanical supporter, with minimal effects of fingerprint image distortion from back scattering. Furthermore, the acoustic attenuator includes solid geometric features, solid plate(s) with holes, or solid inhomogeneous materials that provide increased mechanical strength or robustness to an electronic device, such as a mobile device, compared to an air layer or foam layer. The acoustic attenuator may include a plurality of geometric features in a medium, where materials for the geometric features and the medium may be selected from a wide diversity of materials. As such, fabrication of the acoustic attenuator may be largely material-independent, which reduces complexity and costs of fabrication. Moreover, a size or thickness of the acoustic attenuator may be relatively small and absorb, store, trap, or otherwise attenuate acoustic waves, thereby occupying less space in an electronic device compared to an air layer or a foam layer.

FIG. 1 shows a diagrammatic representation of an example mobile device 100 that includes an ultrasonic sensing system according to some implementations. The mobile device 100 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes a housing (or "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with, or otherwise communicating information to or receiving information from, a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The mobile device 100 may include an ultrasonic sensing system 118 capable of scanning and imaging an object signature, such as a fingerprint, palm print or handprint. In some implementations, the mobile device 100 an ultrasonic sensing system 118 that includes an acoustic attenuator layer (not shown) as described below with respect to FIGS. 7A-7D, 8A-8D, 9A-9D, 10A-10D, 11A-11C, and 12A-12C. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the mobile device 100 as well as a fingerprint sensor to enable security features such as user authentication features.

Figure 2A:
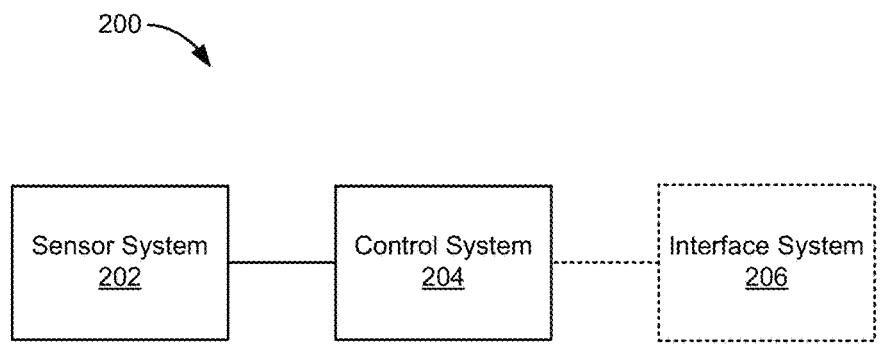
FIG. 2A shows a block diagram representation of components of an example ultrasonic sensing system according to some implementations.

FIG. 2A shows a block diagram representation of components of an example ultrasonic sensing system 200 according to some implementations. As shown, the ultrasonic sensing system 200 may include a sensor system 202 and a control system 204 electrically coupled to the sensor system 202. The sensor system 202 may be capable of scanning an object and providing raw measured image data usable to obtain an object signature, for example, such as a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
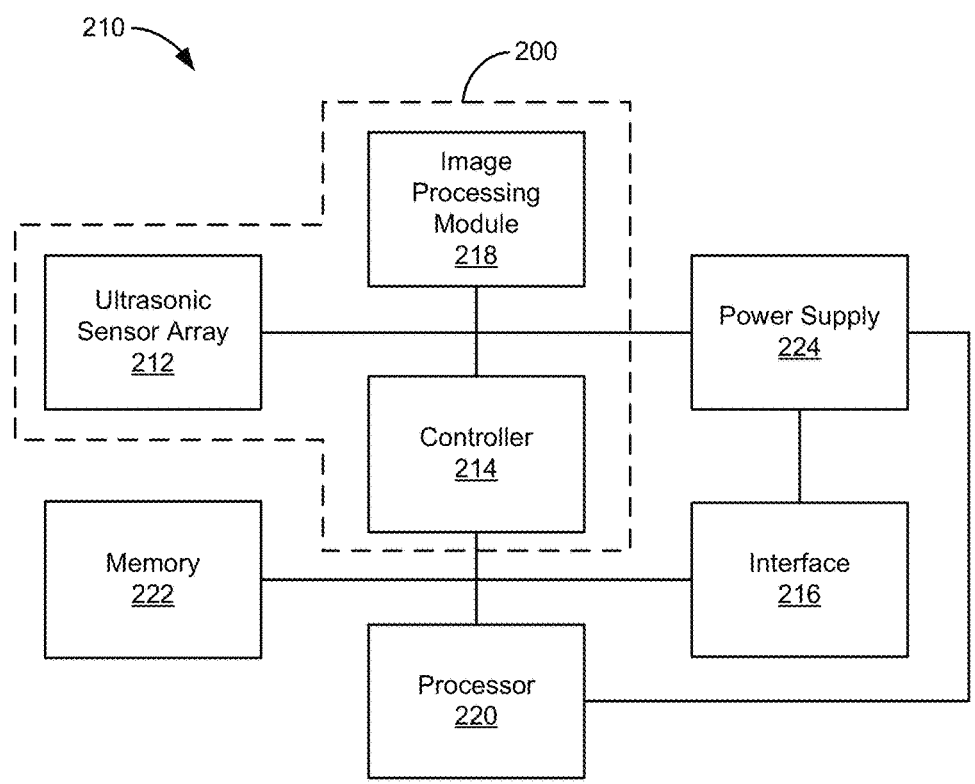
FIG. 2B shows a block diagram representation of components of an example mobile device that includes the ultrasonic sensing system of FIG. 2A.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the mobile device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of the controller 214 and processor 220 may store data in the memory 222. For example, the data stored in the memory 222 may include raw measured image data, filtered or otherwise processed image data, estimated PSF or estimated image data, and final refined PSF or final refined image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein. It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
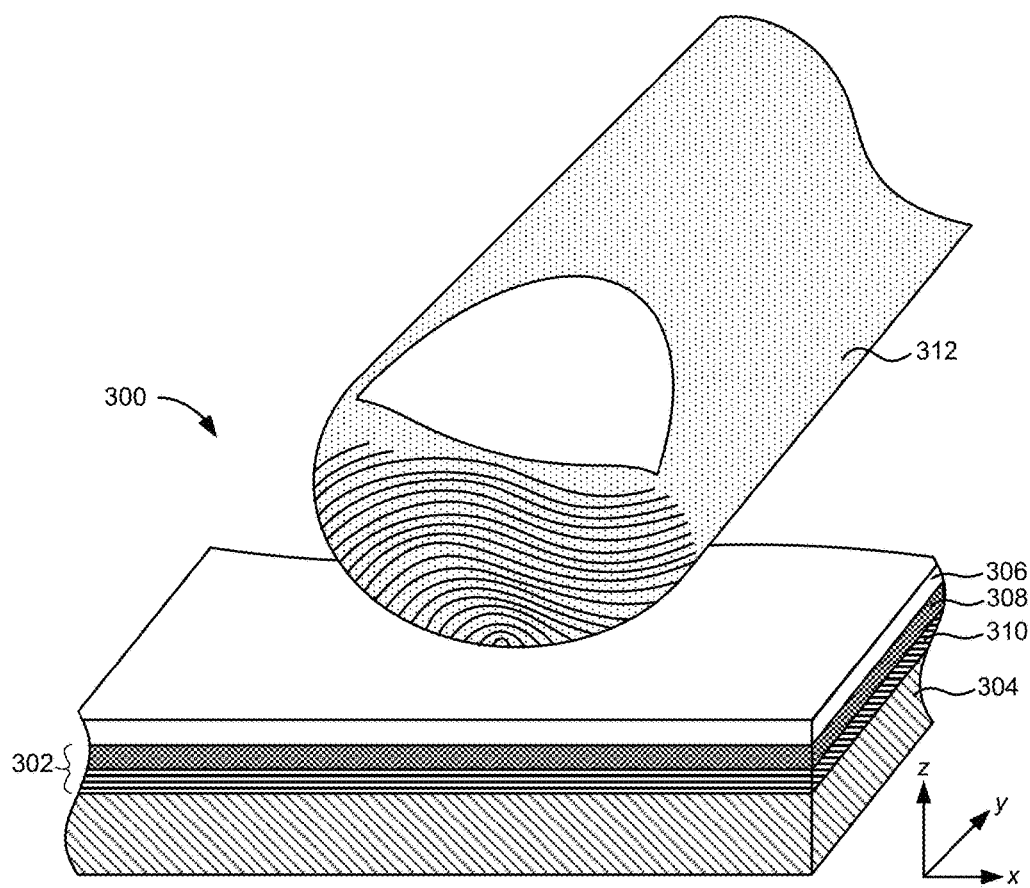
FIG. 3A shows a cross-sectional projection view of a diagrammatic representation of a portion of an example ultrasonic sensing system according to some implementations.
Figure 3B:
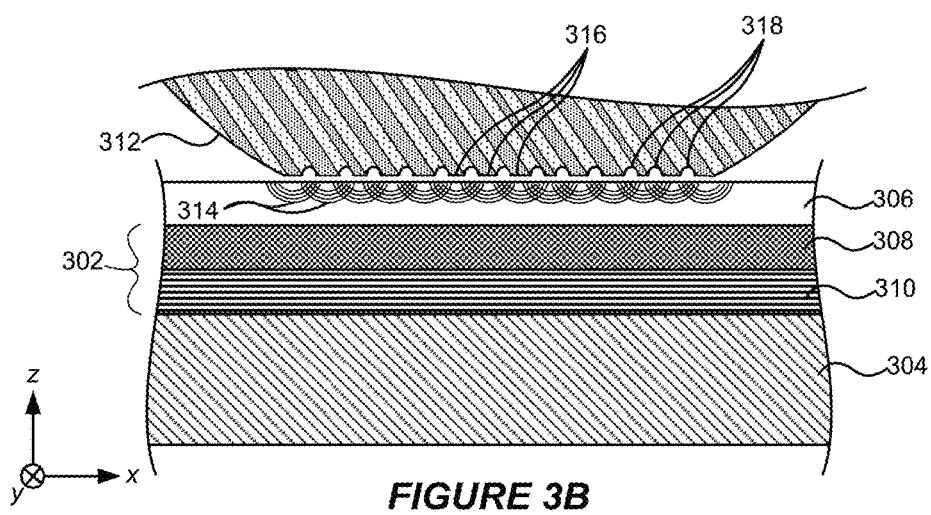
FIG. 3B shows a zoomed-in cross-sectional side view of the example ultrasonic sensing system of FIG. 3A according to some implementations.

FIG. 3A shows a cross-sectional projection view of a diagrammatic representation of a portion of an example ultrasonic sensing system 300 according to some implementations. FIG. 3B shows a zoomed-in cross-sectional side view of the example ultrasonic sensing system 300 of FIG. 3A according to some implementations. For example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 is generally configured to generate ultrasonic waves towards the platen 306, and in the illustrated implementation, towards a human finger positioned on the upper surface of the platen. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as PVDF-TrFE. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

Figure 4:
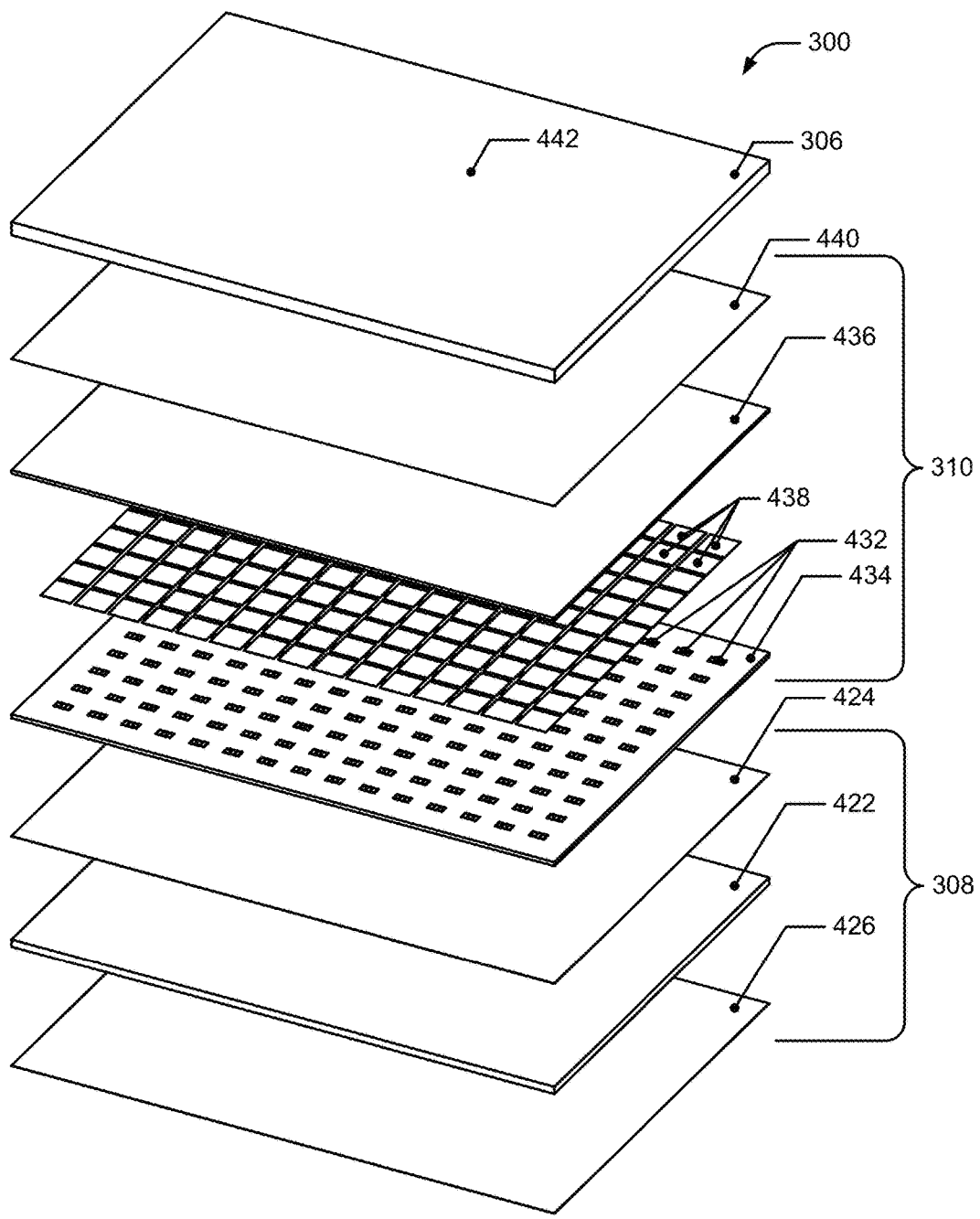
FIG. 4 shows an exploded projection view of example components of the example ultrasonic sensing system of FIGS. 3A and 3B according to some implementations.

The ultrasonic receiver 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308 (as shown in FIG. 4 described below). The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled to the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner.

In some implementations, the platen 306 may have a thickness in the range of about 10 microns (μm) to about 1000 μm or more.

In some implementations, the ultrasonic sensing system 300 may further include a focusing layer (not shown). For example, the focusing layer may be positioned above the ultrasonic transmitter 308. The focusing layer may generally include one or more acoustic lenses capable of altering the paths of ultrasonic waves transmitted by the ultrasonic transmitter 308. In some implementations, the lenses may be implemented as cylindrical lenses, spherical lenses or zone lenses. In some implementations, some or all of the lenses may be concave lenses, whereas in some other implementations some or all of the lenses may be convex lenses, or include a combination of concave and convex lenses.

In some implementations that include such a focusing layer, the ultrasonic sensing device 300 may additionally include an acoustic matching layer to ensure proper acoustic coupling between the focusing lens(es) and an object, such as a finger, positioned on the platen 306. For example, the acoustic matching layer may include an epoxy doped with particles that change the density of the acoustic matching layer. If the density of the acoustic matching layer is changed, then the acoustic impedance will also change according to the change in density, if the acoustic velocity remains constant. In alternative implementations, the acoustic matching layer may include silicone rubber doped with metal or with ceramic powder. In some implementations, sampling strategies for processing output signals may be implemented that take advantage of ultrasonic reflections being received through a lens of the focusing layer. For example, an ultrasonic wave coming back from a lens' focal point will travel into the lens and may propagate towards multiple receiver elements in a receiver array fulfilling the acoustic reciprocity principle. Depending on the signal strength coming back from the scattered field, an adjustment of the number of active receiver elements is possible. In general, the more receiver elements that are activated to receive the returned ultrasonic waves, the higher the signal-to-noise ratio (SNR). In some implementations, one or more acoustic matching layers may be positioned on one or both sides of the platen 306, with or without a focusing layer.

FIG. 4 shows an exploded projection view of example components of the example ultrasonic sensing system 300 of FIGS. 3A and 3B according to some implementations. The ultrasonic transmitter 308 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter layer 422 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards a target object, such as a finger, passing through the platen 306. A portion of the ultrasonic waves not absorbed or transmitted by the target object may be reflected back through the platen 306 and received by the ultrasonic receiver 310, which, in the implementation illustrated in FIG. 4, overlies the ultrasonic transmitter 308. The ultrasonic receiver 310 may include an array of sensor pixel circuits 432 disposed on a substrate 434 and a piezoelectric receiver layer 436. In some implementations, each sensor pixel circuit 432 may include one or more TFT or CMOS transistor elements, electrical interconnect traces and, in some implementations, one or more additional circuit elements such as diodes, capacitors, and the like. Each sensor pixel circuit 432 may be configured to convert an electric charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias electrode 440 is disposed on a side of the piezoelectric receiver layer 436 proximal to the platen 306. The receiver bias electrode 440 may be a metallized electrode and may be grounded or biased to control which signals may be passed to the array of sensor pixel circuits 432. Ultrasonic energy that is reflected from the exposed (upper/top) surface 442 of the platen 306 may be converted into localized electrical charges by the piezoelectric receiver layer 436. These localized charges may be collected by the pixel input electrodes 438 and passed on to the underlying sensor pixel circuits 432. The charges may be amplified or buffered by the sensor pixel circuits 432 and provided to the processing unit. The processing unit may be electrically connected (directly or indirectly) with the first transmitter layer 422 and the second transmitter electrode 426, as well as with the receiver bias electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 422 and the piezoelectric receiver layer 436 is selected so as to be suitable for generating and receiving ultrasonic waves, respectively. In one example, a PVDF piezoelectric transmitter layer 422 is approximately 28 μm thick and a PVDF-TrFE receiver layer 436 is approximately 12 μm thick. Example frequencies of the ultrasonic waves may be in the range of about 1 Megahertz (MHz) to about 100 MHz, with wavelengths on the order of a millimeter or less.

Many electronic devices, including mobile devices and smart phones, use fingerprint authentication as one method of access control. An ultrasonic fingerprint sensor may authenticate a user's fingerprint, where ultrasonic waves generated by a piezoelectric material may travel through a platen on which a person's finger is placed. Some portions of an ultrasonic wave encounter skin that is in contact with the platen, e.g., fingerprint ridges, while other portions of an ultrasonic wave encounter air, e.g., valleys between to ridges of a fingerprint. The ultrasonic waves are reflected back with different intensities towards an ultrasonic sensor array. Reflected signals associated with the finger may be processed and converted to a digital value representing the signal strength of the reflected signal, and a fingerprint image can be obtained.

However, the piezoelectric material not only generates forward-propagating ultrasonic waves towards the finger, but also generates backward-propagating ultrasonic waves towards one or more layers of an ultrasonic fingerprint sensor system. With respect to the piezoelectric material, such layers opposite the platen may be deemed "behind," "below," or "underlying" the piezoelectric material. The platen may be deemed "in front of," "above," or "overlying" the piezoelectric material. The one or more layers behind the piezoelectric material may partially transmit and partially reflect back the backward-propagating ultrasonic waves as a result of any acoustic impedance mismatch. Eventually, the backward-propagating ultrasonic waves reflect or scatter back towards the finger and the piezoelectric material, thereby distorting or adversely affecting the fingerprint image.

Figure 5:
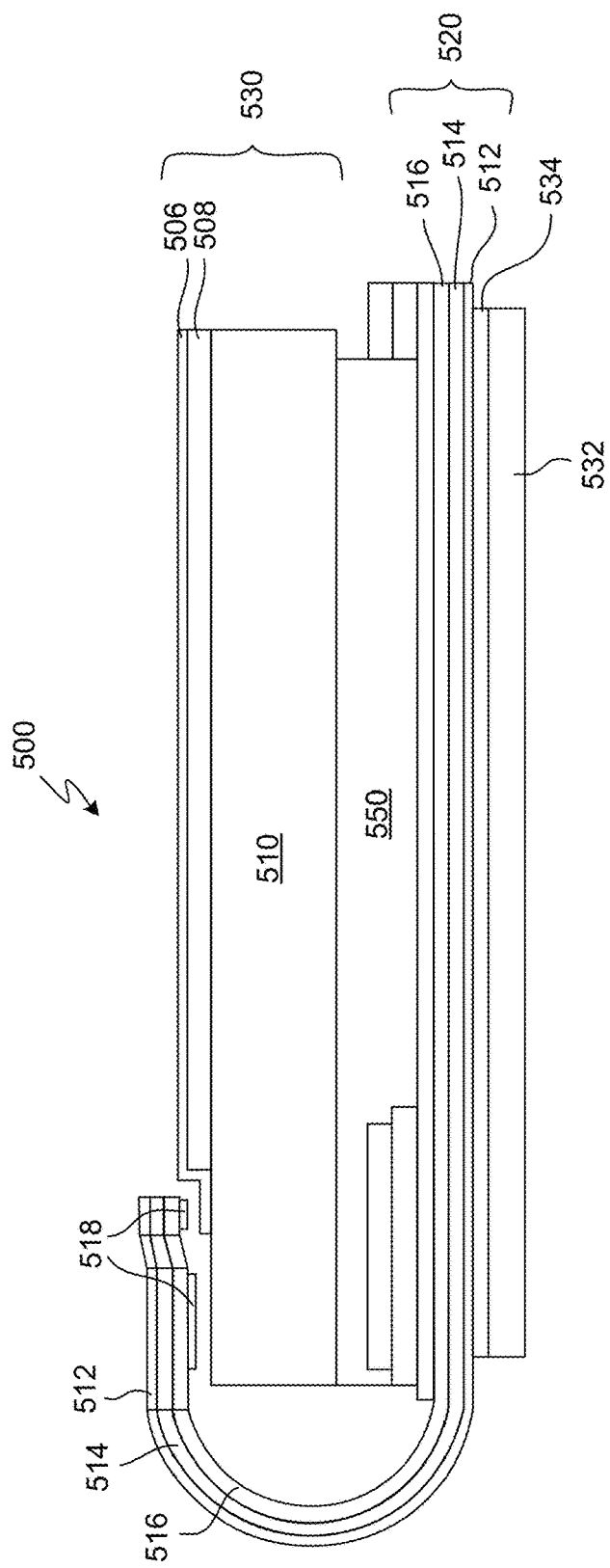
FIG. 5 shows a cross-sectional side view of an example ultrasonic fingerprint sensing system according to some implementations.

FIG. 5 shows a cross-sectional side view of an example ultrasonic fingerprint sensing system according to some implementations. In FIG. 5, the ultrasonic fingerprint sensing system 500 includes a fingerprint module 530, where the fingerprint module 530 includes an ultrasonic sensor layer 510 and an ultrasonic transmitter layer 508 adjacent to the ultrasonic sensor layer 510. In FIG. 5, the ultrasonic transmitter layer 508 is above or in front of the ultrasonic sensor layer 510. With respect to the ultrasonic sensor layer 510 in FIG. 5, terms such as "above," "over," or "front" can refer to a side of the ultrasonic sensor layer 510 facing towards the ultrasonic transmitter layer 508 and terms such as "below," "under," and "behind" can refer to a side of the ultrasonic sensor layer 510 facing opposite the ultrasonic transmitter layer 508. In some implementations, the ultrasonic sensor layer 510 may correspond with the ultrasonic receiver 310 in FIGS. 3A, 3B, and 4, and the ultrasonic transmitter layer 508 may correspond with the ultrasonic transmitter 308 in FIGS. 3A, 3B, and 4.

The fingerprint module 530 may be positioned over a flexible printed circuit board (PCB) 520. However, it will be understood in the present disclosure that the fingerprint module 530 may be positioned over any component of an electronic device, such as a mechanical support, rigid PCB, flexible PCB, cover glass, display, metal platen, etc. Additionally, the fingerprint module 530 may be positioned over a component such as a battery, speaker, or plastic or metal part of a display module.

The flexible PCB 520 may also be referred to as a flex circuit or flexible circuit. The flexible PCB 520 underlies the fingerprint module 530 and may wrap around to a front side of the fingerprint module 530. The flexible PCB 520 can include, for example, a conductive layer 516, where the conductive layer 516 can include any electrically conductive material such as copper. The flexible PCB 520 can further include a base film layer 514 adjacent to the conductive layer 516 and an electromagnetic shielding layer 512 adjacent to the base film layer 514. For example, the base film layer 514 can be a layer between two electrically conductive layers (e.g., copper) and can include a material such as polyimide. The electromagnetic shielding layer 512 can serve to block undesirable electromagnetic radiation from interfering with the operation of the ultrasonic fingerprint sensing system 500. In some implementations, the conductive layer 516 can be electrically connected to one or more electrodes 518 for activating a piezoelectric material of the ultrasonic transmitter layer 508. In FIG. 5, the electrodes 518 face a front side of the fingerprint module 530.

A stiffener 532 underlies a portion of the flexible PCB 520 to rigidize one or more areas of the flexible PCB 520. Typically, electronic devices can include components that are vulnerable to denting and other types of structural damage. The flexible PCB 520 may be susceptible to denting and other types of structural damage. The underlying stiffener 532 can be disposed on the flexible PCB 520 to mechanically support and protect the flexible PCB 520 and other components of the ultrasonic fingerprint sensing system 500. The stiffener 532 may include a semiconductor material, a metal or metal alloy, or other material with a high flex modulus or mechanical strength to structurally and environmentally protect the ultrasonic fingerprint sensing system 500. In some implementations, the stiffener 532 has a thickness between about 50 µm and about 500 µm. In some implementations, a bonding layer 534 is positioned between the stiffener 532 and the flexible PCB 520 to bond the stiffener 532 to the exterior of the flexible PCB 520. For example, the bonding layer 534 can include an adhesive, such as benzocyclobutene (BCB), polyimide (PI), polybenzoxazole (PBO), or FGBF-700 manufactured by Tatsuta Electric Wire and Cable Co. of Osaka, Japan.

The fingerprint module 530 can include an ultrasonic transmitter layer 508 on a front side of the fingerprint module 530. The ultrasonic transmitter layer 508 can include a piezoelectric material configured to generate ultrasonic waves. A voltage may be applied to the piezoelectric material to cause the piezoelectric material to stretch or contract, thereby resulting in the generation of ultrasonic waves. The piezoelectric material can include, for example, a polyvinylidene fluoride (PVDF) or a PVDF copolymer such as PVDF-TrFE. An ultrasonic wave is an acoustic wave that has a frequency above about 20 kHz. In some implementations, ultrasonic waves have a frequency between about 1 MHz and about 100 MHz, such as between about 5 MHz and about 20 MHz.

In some implementations, one or more electrically conductive layers 506 are disposed on the ultrasonic transmitter layer 508. For example, the one or more electrically conductive layers 506 can include silver ink. The one or more electrodes 518 of the flexible PCB 520 may contact the one or more electrically conductive layers 506 when pressed. This creates an electrically conductive pathway to allow a voltage to be applied from the flexible PCB 520 to the ultrasonic transmitter layer 508. In some implementations, a platen (not shown) is disposed over the one or more electrically conductive layers 506. A finger (not shown) may press against the platen to activate the piezoelectric material of the ultrasonic transmitter layer 508.

Acoustic waves are longitudinal waves that have the same direction of vibration as their direction of travel. Acoustic waves push particles in a medium, whether the medium is a solid, liquid, or gas. Acoustic waves travel at the speed of sound, which depends on the medium they're passing through. Acoustic impedance in a material measures the opposition to acoustic flow resulting from an acoustic pressure applied to the material. Acoustic impedance enables determination of the reflection and transmission of acoustic energy at boundaries. If the acoustic impedance of two media is very different, then most acoustic energy will be reflected or absorbed, rather than transmitted across the boundary. Acoustic impedance may be measured in terms of pascal second per cubic meter (Pa-s/m$^3$) or the rayl per square meter (rayl/m$^2$).

The fingerprint module 530 further includes an ultrasonic sensor layer 510 underlying or positioned behind the ultrasonic transmitter layer 508, though it is understood that other configurations or arrangements are possible. The ultrasonic sensor layer 510 is configured to detect ultrasonic reflections resulting from interactions of the ultrasonic waves transmitted by the ultrasonic transmitter layer 508 with a fingerprint of a finger being scanned. The ultrasonic sensor layer 510 may generate electrical output signals corresponding to the detected ultrasonic reflections. The ultrasonic sensor layer 510 may serve as an ultrasonic receiver layer that includes a TFT layer or TFT substrate. The TFT layer can include an array of sensor pixel circuits configured to amplify the electrical output signals. The TFT layer may transfer the amplified electrical output signals to a processor for converting the signals to a fingerprint image. In some implementations, the ultrasonic fingerprint sensing system 500 further includes a control system (not shown) coupled to the ultrasonic sensor layer 510. The control system is configured to receive fingerprint sensor data from the ultrasonic sensor layer 510, and extract fingerprint data from the fingerprint sensor data, where the fingerprint data corresponds to fingerprints of a user's hand. The control system of the ultrasonic fingerprint sensing system 500 may correspond to the control system 204 of FIG. 2A or the controller 214 of FIG. 2B.

The fingerprint module 530 may further include a sensor active area 550 underlying or positioned behind the ultrasonic sensor layer 510. A space may exist between the flexible PCB 520 and the ultrasonic sensor layer 510. The sensor active area 550 may be positioned in such a space to provide for an acoustic shielding structure or an acoustic attenuator layer, where an acoustic shielding structure or acoustic attenuator layer is described in more detail below in FIGS. 7A-7D, 8A-8D, 9A-9D, 10A-10D, 11A-11C, and 12A-12C. Thus, the space for the sensor active area 550 may be incorporated in the ultrasonic fingerprint sensing system 500 to accommodate the acoustic shielding structure of the present disclosure. The acoustic shielding structure in the sensor active area 550 is configured to absorb, store, trap, or otherwise attenuate ultrasonic waves. This prevents or limits ultrasonic waves from being transmitted to and reaching components that are underlying the ultrasonic sensor layer 510, including the flexible PCB 520 and the stiffener 532. Such layers that are underlying the ultrasonic sensor layer 510 but not including the acoustic shielding structure may be referred to as one or more backing layers or may include the one or more backing layers. The one or more backing layers include a material with an acoustic impedance that is different than the ultrasonic sensor layer 510. In FIG. 5, the one or more backing layers include an electrically conductive layer 516, a base film layer 514, an electromagnetic shielding layer 512, a bonding layer 534, and a stiffener 532.

The ultrasonic fingerprint sensing system 500 in FIG. 5 may be part of a mobile device or other electronic device. A mobile device can include the mobile device 100 of FIG. 1. The mobile device can include a platen as described in FIGS. 3A-3B and 4, an ultrasonic fingerprint sensing system 500 that includes an ultrasonic transmitter layer 508 and an ultrasonic sensor layer 510 underlying the ultrasonic transmitter layer 508 as described in FIG. 5, an acoustic attenuator layer underlying the ultrasonic sensor layer 510 as described in FIGS. 7A-7D, 8A-8D, 9A-9D, 10A-10D, 11A-11C, and 12A-12C, and one or more backing layers underlying the acoustic attenuator layer. The acoustic attenuator layer is configured to absorb or at least attenuate ultrasonic waves.

Figure 6A:
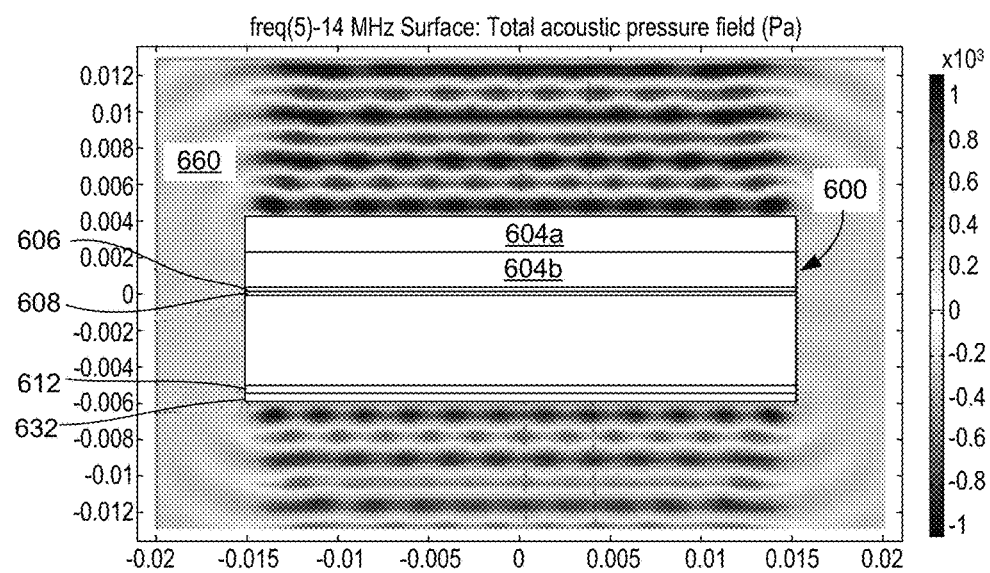
FIG. 6A shows an acoustic pressure field around an example stack of an ultrasonic fingerprint sensing system according to some implementations.
Figure 6B:
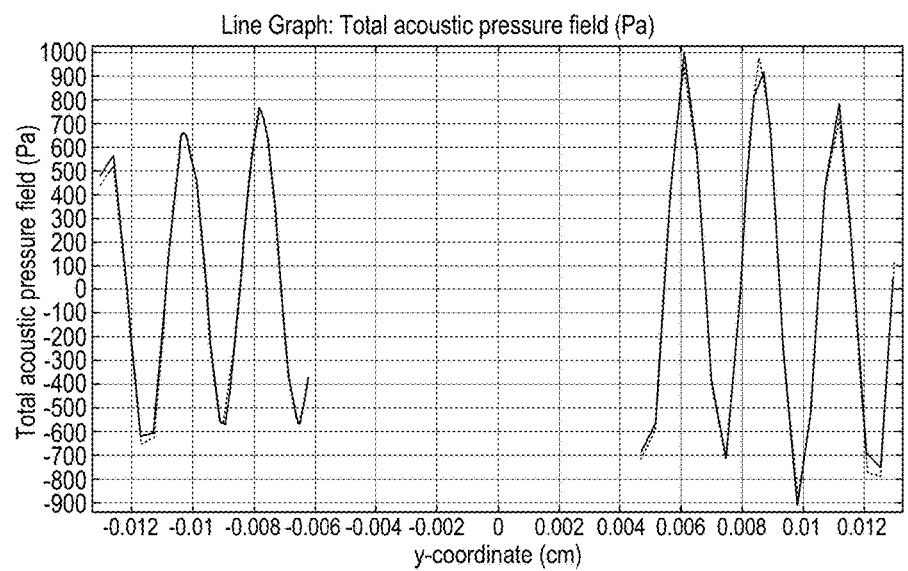
FIG. 6B shows a plot of the acoustic pressure field of the example stack of the ultrasonic fingerprint sensing system of FIG. 6A according to some implementations.

Many pre-existing ultrasonic fingerprint sensing systems do not include an acoustic shielding structure for absorbing or attenuating ultrasonic waves. FIG. 6A shows an acoustic pressure field around an example stack of an ultrasonic fingerprint sensing system according to some implementations. FIG. 6B shows a plot of the acoustic pressure field of the example stack of the ultrasonic fingerprint sensing system of FIG. 6A according to some implementations. The stack 600 includes an ultrasonic transmitter layer 608, an electrically conductive layer 606 over the ultrasonic transmitter layer 608, and glass layers 604a, 604b over the electrically conductive layer 606. The glass layers 604a, 604b may serve a similar function as a platen for the stack 600 of the ultrasonic fingerprint sensing system. The ultrasonic transmitter layer 608 includes a piezoelectric material configured to generate acoustic waves upon application of a voltage. The stack 600 further includes an ultrasonic sensor layer 610 below the ultrasonic transmitter layer 608, an electromagnetic shielding layer 612 below the ultrasonic sensor layer 610, and a glass layer 632 below the electromagnetic shielding layer 612.

When acoustic waves are generated by the piezoelectric material of the ultrasonic transmitter layer 608, some of the generated acoustic waves propagate forwards towards the electrically conductive layer 606 and the glass layers 604a, 604b, and some of the generated acoustic waves propagate backwards towards the electromagnetic shielding layer 612 and the glass layer 632. Any acoustic impedance mismatch between layers in the stack 600 will cause some acoustic waves to reflect and some acoustic waves to transmit through the layers. As shown in FIG. 6A, layers underlying the ultrasonic transmitter layer 608 are made of different materials, thereby resulting in acoustic impedance mismatches. Specifically, the electromagnetic shielding layer 612 is made of a different material than the ultrasonic sensor layer 610, and the glass layer 632 is made of a different material than the electromagnetic shielding layer 612 and/or the ultrasonic sensor layer 610. The stack 600 is surrounded by air 660, which also provides an acoustic impedance mismatch with adjacent materials. The acoustic pressure can be measured in the air 660 so that an acoustic pressure field can be generated. As a result, backward-propagating ultrasonic waves may reflect and combine with the detected ultrasonic reflections from the finger, thereby interfering with the fingerprint imaging of the ultrasonic fingerprint sensing system. In FIGS. 6A and 6B, not only do acoustic waves transmit forwards from the ultrasonic transmitter layer 608 through overlying layers (e.g., electrically conductive layer 606 and glass layers 604a, 604b), but acoustic waves transmit backwards from the ultrasonic transmitter layer 608 through underlying layers (e.g., ultrasonic sensor layer 610, electromagnetic shielding layer 612, and glass layer 632). This shows that backward-propagating ultrasonic waves are not prevented from transmitting through the underlying layers in the stack 600. Such backward-propagating ultrasonic waves may reflect back and degrade a fingerprint image.

If an air box or foam layer is incorporated in the ultrasonic fingerprint sensing system and underlying the ultrasonic sensor layer 610, the air box or foam layer may have an acoustic impedance that is much different than the ultrasonic sensor layer 610, which can lead to total reflection of backward-propagating ultrasonic waves. This may prevent the backward-propagating ultrasonic waves from transmitting through the underlying layers in the stack 600. However, an air box or foam layer may not be mechanically robust in supporting or protecting components of the ultrasonic fingerprint sensing system. Furthermore, the air box or foam layer may be relatively thick and increase a size of the ultrasonic fingerprint sensing system. Such increases in size of the ultrasonic fingerprint sensing system may be undesirable in various electronic devices.

The acoustic shielding structure of the present disclosure can prevent or at least attenuate the backward-propagating ultrasonic waves from transmitting through underlying layers in an ultrasonic fingerprint sensing system. The acoustic shielding structure may provide sufficient mechanical robustness to support or protect components of the ultrasonic fingerprint sensing system, and the acoustic shielding structure may be relatively thin to reduce or at least limit any increase to the size of the ultrasonic fingerprint sensing system. The acoustic shielding structure may include a plurality of geometric features or holes that are periodically spaced apart in a medium for absorbing, storing, trapping, or at least attenuating the backward-propagating ultrasonic waves. The acoustic shielding structure may be incorporated in the mobile device 100 of FIG. 1, the ultrasonic sensing system 200 of FIG. 2A, the ultrasonic sensing system 210 of FIG. 2B, the ultrasonic sensing system 300 of FIGS. 3A-3B and 4, or the ultrasonic fingerprint sensing system 500 of FIG. 5. The acoustic shielding structure may also be referred to as an acoustic attenuator or acoustic attenuator layer. Various examples of acoustic attenuator layers are described below with respect to FIGS. 7A-7D, 8A-8D, 9A-9D, 10A-10D, 11A-11C, and 12A-12C.

Figure 7A:
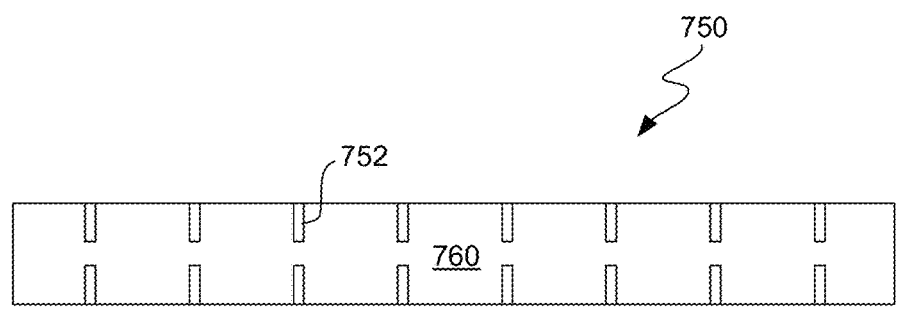
FIG. 7A shows cross-sectional schematic diagram of an example acoustic attenuator layer including a plurality of discontinuous vertical components in a medium according to some implementations.
Figure 7B:
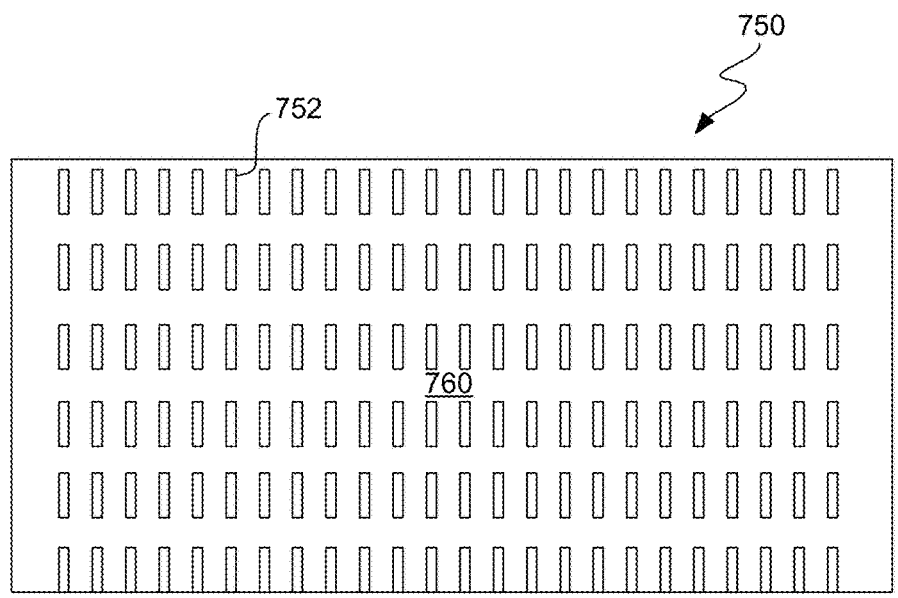
FIG. 7B shows a top view of the example acoustic attenuator layer of FIG. 7A according to some implementations.

FIG. 7A shows cross-sectional schematic diagram of an example acoustic attenuator layer including a plurality of discontinuous vertical components in a medium according to some implementations. FIG. 7B shows a top view of the example acoustic attenuator layer of FIG. 7A according to some implementations. The acoustic attenuator layer 750 includes a plurality of vertical components or features 752 in a medium 760. As used herein, the terms "horizontal" and "vertical" depend on the orientation of the acoustic attenuator layer 750. "Horizontal" is defined as substantially parallel to the plane defined by a major surface of the acoustic attenuator layer 750, and "vertical" is defined as substantially orthogonal to the plane defined by the major surface of the acoustic attenuator layer 750. For example, horizontal dimensions may refer to a length and width of the acoustic attenuator layer 750, and vertical dimensions may refer to a thickness or height of the acoustic attenuator layer 750. Each of the vertical components 752 may longitudinally span a direction across a thickness of the acoustic attenuator layer 750. In some implementations, a thickness of the acoustic attenuator layer 750 is between about 50 μm and about 500 μm.

The medium 760 can have an acoustic impedance different than an acoustic impedance of the plurality of vertical components 752. The medium 760 includes a material that is different than a material of the vertical components 752. The medium 760 can include any solid, liquid, or gaseous material, such as a metal, ceramic, plastic, or air. In some implementations, the medium 760 includes copper, alumina, or air. The material of the medium 760 can provide a bulk of the material of the acoustic attenuator layer 750. For example, the material of the medium 760 can constitute at least 80% by volume, at least 90% by volume, or at least 95% by volume the material of the acoustic attenuator layer 750. In particular, the medium 760 can fill or constitute a substantial portion of the acoustic attenuator layer 750.

The vertical components 752 can generally include any solid material, such as a metal, ceramic, or plastic. The plurality of vertical components 752 may be spaced apart or separated from each other in a horizontal direction (e.g., length and/or width) of the acoustic attenuator layer 750. In some implementations, the plurality of vertical components 752 are periodically spaced apart. In other words, each of the vertical components 752 is uniformly spaced apart from each other. In some implementations, the plurality of vertical components 752 are arranged as an array in the medium 760. In some implementations, the plurality of vertical components 752 are periodically spaced apart by a distance between a quarter-wavelength and a half-wavelength of the ultrasonic wave. Without being limited by any theory, since ultrasonic waves are sinusoidal waves having peaks and valley in a periodic manner, arranging the vertical components 752 at such periodic distances between a quarter-wavelength and a half-wavelength causes the ultrasonic waves to be trapped or stored in the acoustic attenuator layer 750.

The ultrasonic wave generated by the piezoelectric material of an ultrasonic transmitter layer will have a known frequency, such as 8 MHz or 17 MHz. The wavelength can be calculated by the equation: $\lambda=c/f$, where $\lambda$ represents wavelength, c represents the velocity of the wave, and f represents the frequency of the wave. Assuming the velocity of the ultrasonic wave is 340 m/s in air, then a quarter-wavelength for an ultrasonic wave having frequency of 8 MHz is 10.625 μm and a half-wavelength for an ultrasonic wave having frequency of 8 MHz is 21.25 μm. In some implementations, a horizontal distance (e.g., length) of the acoustic attenuator layer 750 can be between 1 mm and about 50 mm, and so several hundreds of vertical components 752 may be periodically spaced apart in the medium 760 of the acoustic attenuator layer 750. Thus, more vertical components 752 may be formed or otherwise disposed in the acoustic attenuator layer 750 than what is shown in FIGS. 7A and 7B.

As shown in the implementation in FIG. 7A, the plurality of vertical components 752 are discontinuous across a thickness of the acoustic attenuator layer 750. Put another way, one or more gaps exist in each of the plurality of vertical components 752 across a thickness of the acoustic attenuator layer 750. The gap size can be relatively small, such as between about 1 μm and about 50 μm or between about 5 μm and about 30 μm. Acoustic waves are longitudinal waves. When a vibration occurs, the longitudinal waves displace particles in a medium. Without being limited by any theory, the one or more gaps in each of the plurality of vertical components 752 prevent the longitudinal waves from displacing or pushing all the way across the thickness of the acoustic attenuator layer 750. Otherwise, without the one or more gaps, the longitudinal wave may transfer across the thickness of the acoustic attenuator layer 750. The absence of the one or more gaps and its effect on limiting back scattering is illustrated in FIGS. 7E and 7F.

Figure 7C:
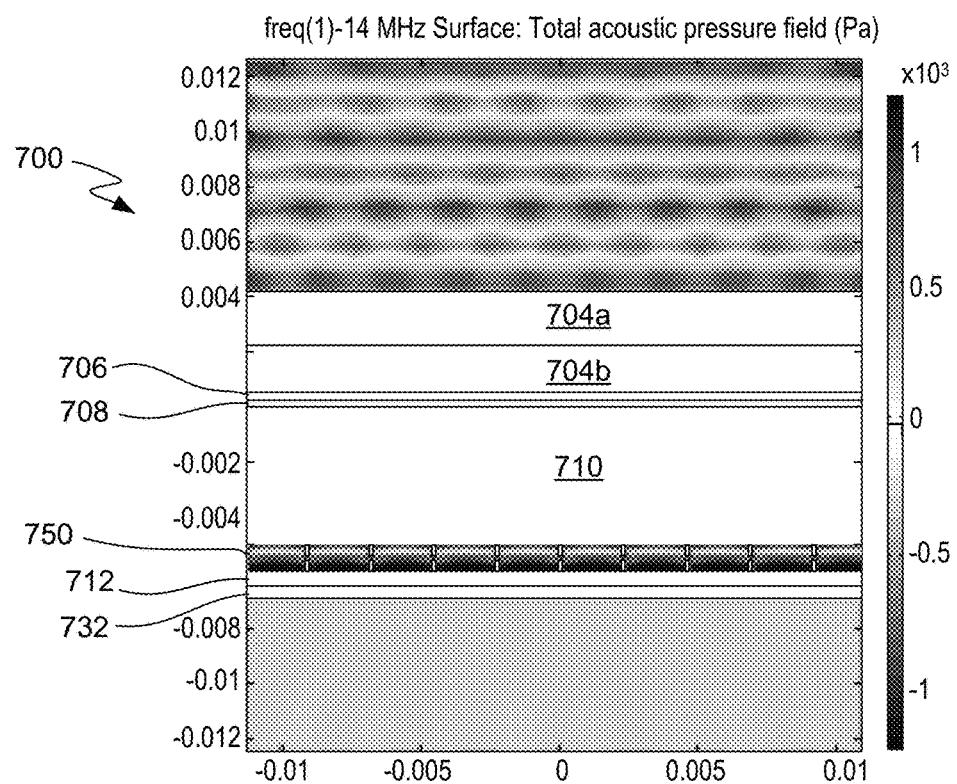
FIG. 7C shows an acoustic pressure field around an example stack of an ultrasonic fingerprint sensing system including the acoustic attenuator layer of FIG. 7A according to some implementations.
Figure 7D:
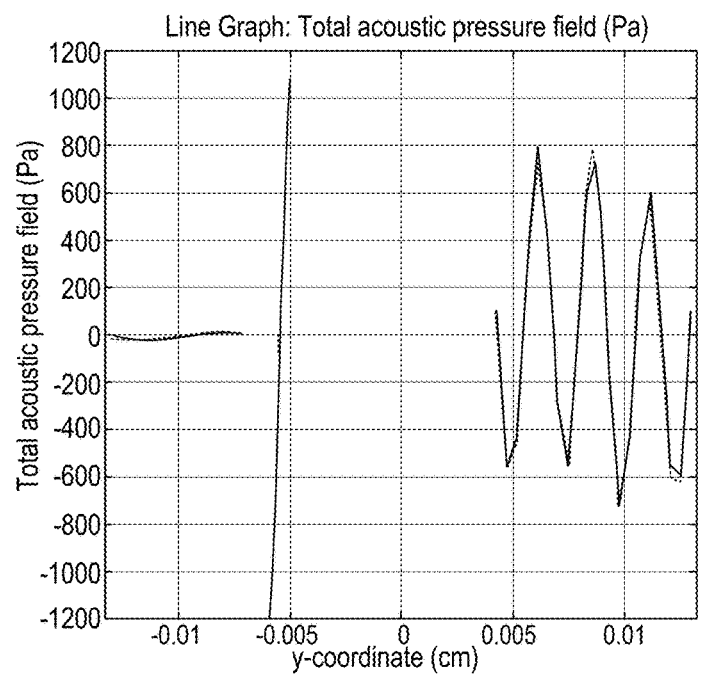
FIG. 7D shows a plot of the acoustic pressure field of the example stack of the ultrasonic fingerprint sensing system of FIG. 7C according to some implementations.

FIG. 7C shows an acoustic pressure field around an example stack of an ultrasonic fingerprint sensing system including the acoustic attenuator layer of FIG. 7A according to some implementations. FIG. 7D shows a plot of the acoustic pressure field of the example stack of the ultrasonic fingerprint sensing system of FIG. 7C according to some implementations. The plot in FIG. 7D measures total acoustic pressure along a y-direction of FIG. 7C, where the y-direction is the vertical direction of the stack 700. As shown in FIG. 7C, the stack 700 includes an ultrasonic transmitter layer 708, an electrically conductive layer 706 over the ultrasonic transmitter layer 708, and glass layers 704a, 704b over the electrically conductive layer 706. The stack 700 further includes an ultrasonic sensor layer 710 below the ultrasonic transmitter layer 708, an electromagnetic shielding layer 712 below the ultrasonic sensor layer 710, and a glass layer 732 below the electromagnetic shielding layer 712. Such layers below the ultrasonic sensor layer 710 may be referred to as backing layers of an electronic device or apparatus.

The acoustic attenuator layer 750 of FIG. 7A is between the electromagnetic shielding layer 712 and the ultrasonic sensor layer 710. In some implementations, the medium 760 of the acoustic attenuator layer 750 is air. As shown in FIGS. 7C and 7D, the acoustic attenuator layer 750 absorbs and traps a substantial portion of the acoustic energy from the backward-propagating ultrasonic waves. With respect to absorption by an acoustic attenuator layer, the term "a substantial portion" as used throughout this disclosure refers to at least 80% of the acoustic energy that would otherwise be propagated without an acoustic attenuator layer. A maximum magnitude of the acoustic pressure from the forward-propagating ultrasonic waves is at least 20 times greater than a maximum magnitude of the acoustic pressure from the backward-propagating ultrasonic waves.

Figure 7E:
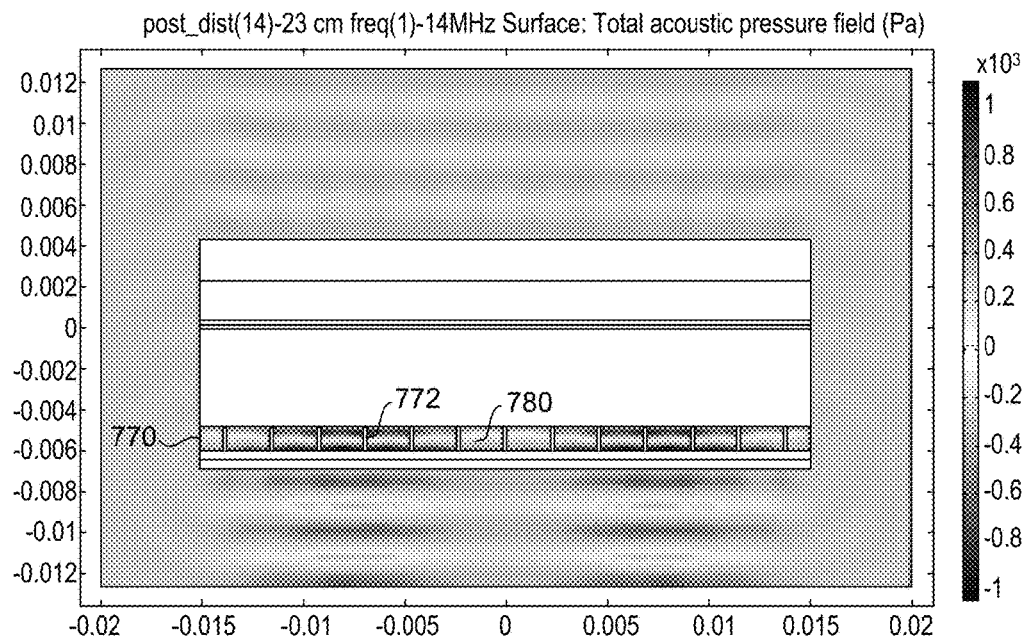
FIG. 7E shows an acoustic pressure field around an example stack of an ultrasonic fingerprint sensing system including an acoustic attenuator layer with continuous vertical components in a medium according to some implementations.
Figure 7F:
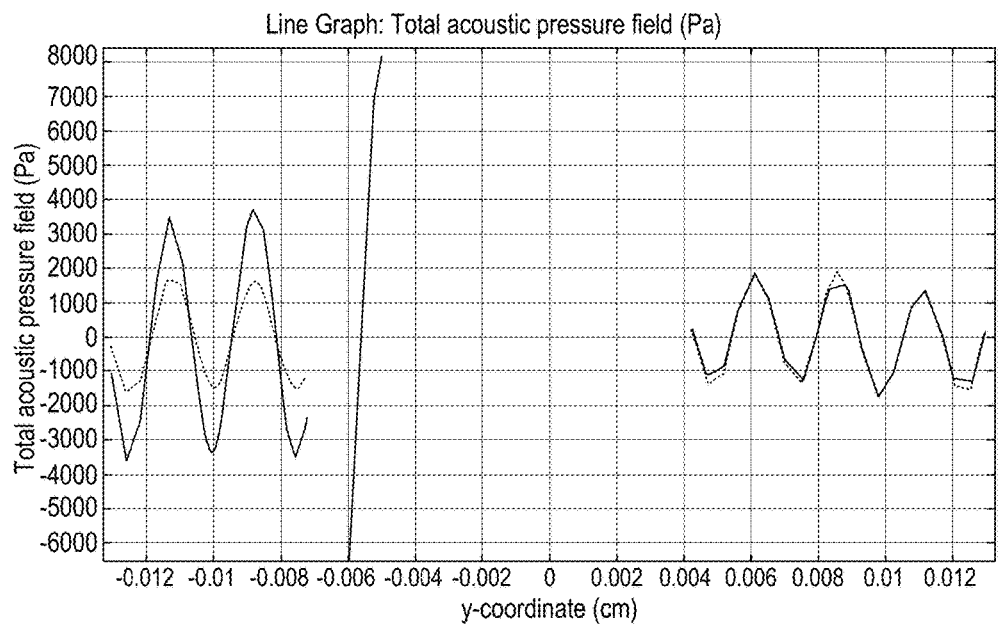
FIG. 7F shows a plot of the acoustic pressure field of the example stack of the ultrasonic fingerprint sensing system of FIG. 7E according to some implementations.

FIG. 7E shows an acoustic pressure field around an example stack of an ultrasonic fingerprint sensing system including an acoustic attenuator layer with continuous vertical components in a medium according to some implementations. FIG. 7F shows a plot of the acoustic pressure field of the example stack of the ultrasonic fingerprint sensing system of FIG. 7E according to some implementations. The plot in FIG. 7F measures total acoustic pressure along a y-direction of FIG. 7E, where the y-direction is the vertical direction of the stack 775. The stack 775 includes an acoustic attenuator layer 770 that includes a plurality of vertical components 772 in a medium 780, where the vertical components 772 are continuous across a thickness of the acoustic attenuator layer 770. In other words, there are no gaps in each of the plurality of vertical components 772 across the thickness of the acoustic attenuator layer 770. In FIGS. 7E and 7F, though the acoustic attenuator layer 770 absorbs or traps some acoustic energy, the acoustic attenuator layer 770 does not absorb or trap a substantial portion of the acoustic energy that would otherwise be propagated without the acoustic attenuator layer 770. A maximum magnitude of the acoustic pressure from the backward-propagating ultrasonic waves is about the same or even greater than a maximum magnitude of the acoustic pressure from the forward-propagating ultrasonic waves. Thus, back scattering of ultrasonic waves still occurs when continuous vertical components 772 are incorporated in an acoustic attenuator layer 770.

Figure 8A:
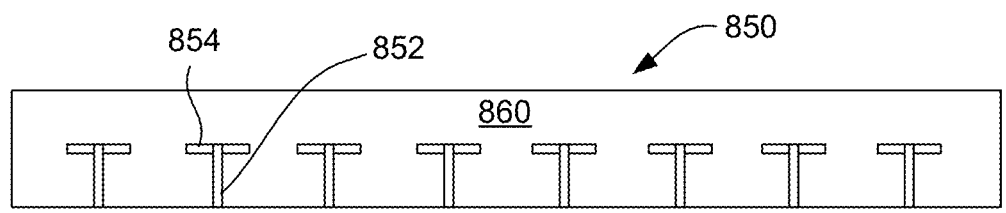
FIG. 8A shows a cross-sectional schematic diagram of an example acoustic attenuator layer including a plurality of horizontal components each intersecting a top of one of a plurality of vertical components in a medium according to some implementations.
Figure 8B:
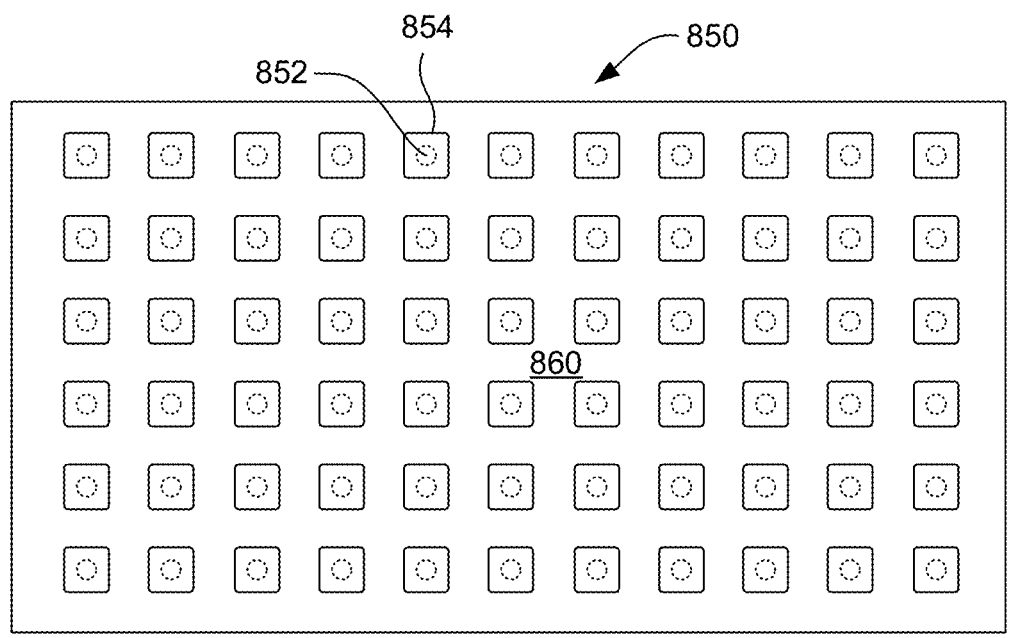
FIG. 8B shows a top view of the example acoustic attenuator layer of FIG. 8A according to some implementations.

FIG. 8A shows a cross-sectional schematic diagram of an example acoustic attenuator layer including a plurality of horizontal components each intersecting a top of one of a plurality of vertical components in a medium according to some implementations. FIG. 8B shows a top view of the example acoustic attenuator layer of FIG. 8A according to some implementations. The acoustic attenuator layer 850 includes a plurality of vertical components 852 and horizontal components 854 in a medium 860. Each of the horizontal components 854 intersects a top portion of one of the vertical components 852 to form a "mushroom-shaped" structure. In such implementations, each vertical component 852 can form a "stem" of the mushroom-shaped structure and each horizontal component 854 can form a "head" of the mushroom-shaped structure. Each of the horizontal components 854 is substantially parallel to a plane defining a major surface of the acoustic attenuator layer 850, and each of the vertical components 852 is substantially orthogonal to each of the horizontal components 854. In some implementations, a thickness of the acoustic attenuator layer 850 is between about 50 μm and about 500 μm.

In some implementations, the vertical components 852 and the horizontal components 854 can be formed from the same material. In some implementations, the vertical components 852 and the horizontal components 854 can be formed from different materials. The vertical components 852 and the horizontal components 854 can generally include any solid material, such as a metal, ceramic, or plastic.

The medium 860 can have an acoustic impedance different than an acoustic impedance of the plurality of vertical components 852 and the plurality of horizontal components 854. Characteristics of the medium 860 can be identical or similar to characteristics of the medium 760 in FIGS. 7A-7B.

The plurality of vertical components 852 and horizontal components 854 may be spaced apart or separated from each other in a horizontal direction (e.g., length and/or width) of the acoustic attenuator layer 850. In some implementations, the plurality of vertical components 852 and horizontal components 854 are periodically spaced apart. In other words, each of the vertical components 852 and horizontal components 854 are uniformly spaced apart from each other. In some implementations, the plurality of vertical components 852 and horizontal components 854 form a plurality of geometric features or structures that are arranged as an array in the medium 860. In some implementations, the plurality of horizontal components 854 are periodically spaced apart by a distance between a quarter-wavelength and a half-wavelength of the ultrasonic wave. This can be measured with respect to any horizontal direction, including the x and/or y direction in a horizontal plane, of the acoustic attenuator layer 850. In addition or in the alternative, the plurality of vertical components 852 are periodically spaced apart by a distance between a quarter-wavelength and a half-wavelength of the ultrasonic wave.

In some implementations, a horizontal distance (e.g., length) of the acoustic attenuator layer 850 can be between 1 mm and about 50 mm, and so several hundreds of vertical components 852 and horizontal components 854 may be periodically spaced apart in the medium 860 of the acoustic attenuator layer 850. Thus, more vertical components 852 and horizontal components 854 may be formed or otherwise disposed in the acoustic attenuator layer 850 than what is shown in FIGS. 8A and 8B.

The plurality of vertical components 852 are discontinuous across a thickness of the acoustic attenuator layer 850. Specifically, at least one gap exists for each of the plurality of vertical components 852 across a thickness of the acoustic attenuator layer 850. Each horizontal component 854 is positioned on top of a vertical component 852. As shown in the implementation in FIG. 8A, a gap separates each horizontal component 854 from a top of the acoustic attenuator layer 850. Without being limited by any theory, the gap from each of the horizontal components 854 to the top of the acoustic attenuator layer 850 prevents the longitudinal waves from displacing or pushing all the way across the thickness of the acoustic attenuator layer 850.

Figure 8C:
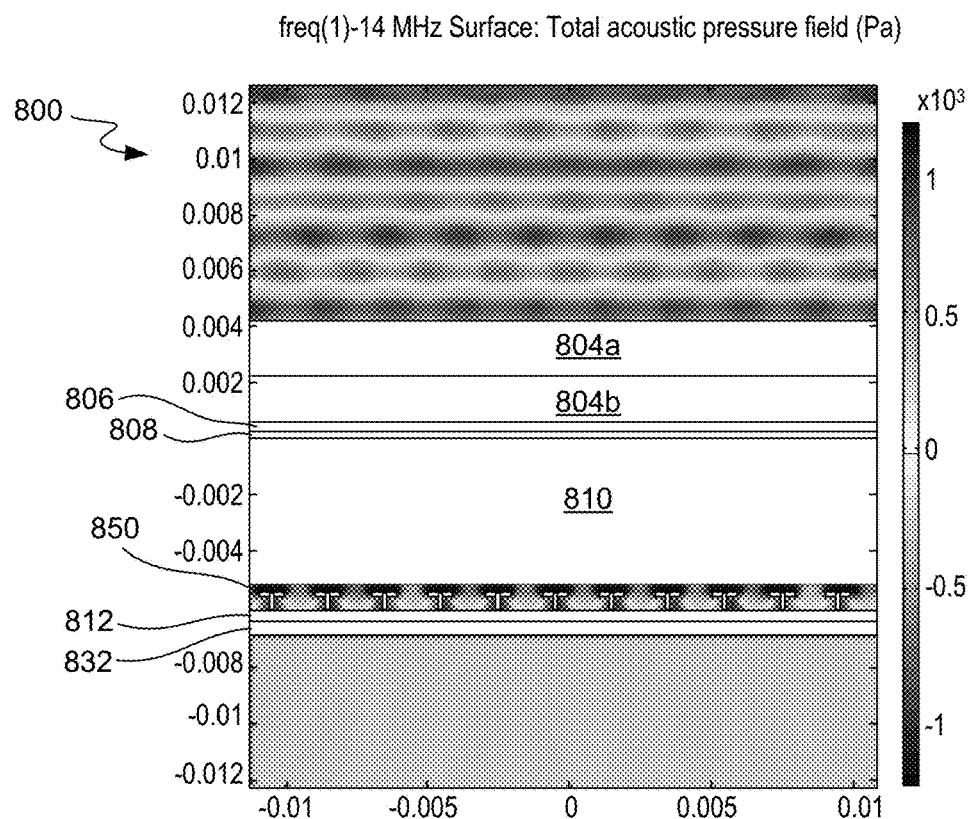
FIG. 8C shows an acoustic pressure field around an example stack of an ultrasonic fingerprint sensing system including the acoustic attenuator layer of FIG. 8A according to some implementations.
Figure 8D:
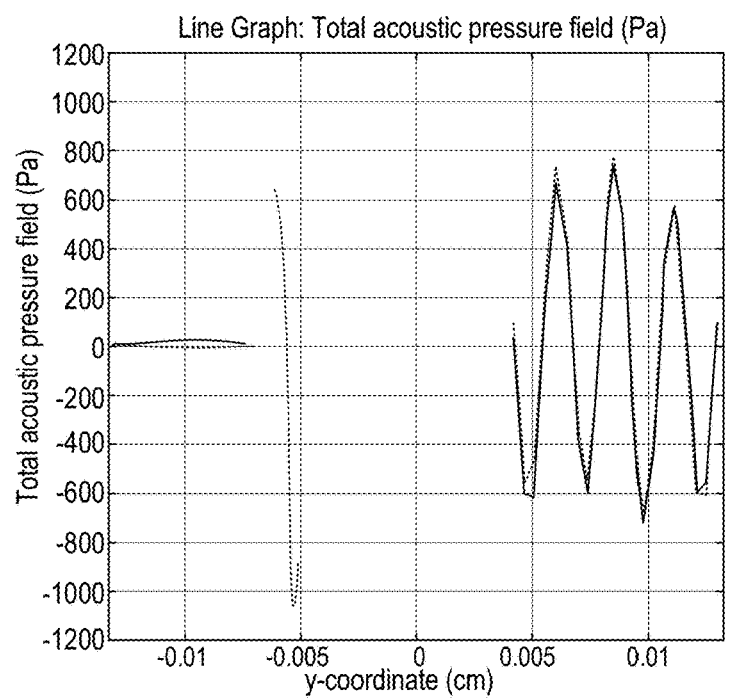
FIG. 8D shows a plot of the acoustic pressure field of the example stack of the ultrasonic fingerprint sensing system of FIG. 8C according to some implementations.

FIG. 8C shows an acoustic pressure field around an example stack of an ultrasonic fingerprint sensing system including the acoustic attenuator layer of FIG. 8A according to some implementations. FIG. 8D shows a plot of the acoustic pressure field of the example stack of the ultrasonic fingerprint sensing system of FIG. 8C according to some implementations. The plot in FIG. 8D measures total acoustic pressure along a y-direction of FIG. 8C, where the y-direction is the vertical direction of the stack 800. As shown in FIG. 8C, the stack 800 includes an ultrasonic transmitter layer 808, an electrically conductive layer 806 over the ultrasonic transmitter layer 808, and glass layers 804a, 804b over the electrically conductive layer 806. The stack 800 further includes an ultrasonic sensor layer 810 below the ultrasonic transmitter layer 808, an electromagnetic shielding layer 812 below the ultrasonic sensor layer 810, and a glass layer 832 below the electromagnetic shielding layer 812. Such layers below the ultrasonic sensor layer 810 may be referred to as backing layers of an electronic device or apparatus.

The acoustic attenuator layer 850 of FIG. 8A is between the electromagnetic shielding layer 812 and the ultrasonic sensor layer 810. In some implementations, the medium 860 of the acoustic attenuator layer 850 is air. The acoustic attenuator 850 absorbs and traps a substantial portion of the acoustic energy from the backward-propagating ultrasonic waves. In some implementations as shown in FIG. 8C, the backward-propagating ultrasonic waves are scattered using the horizontal components 854 and trapped within the vertical components 852. In some implementations as shown in FIG. 8D, a maximum magnitude of the acoustic pressure from the forward-propagating ultrasonic waves is at least 20 times greater than a maximum magnitude of the acoustic pressure from the backward-propagating ultrasonic waves.

Figure 9A:
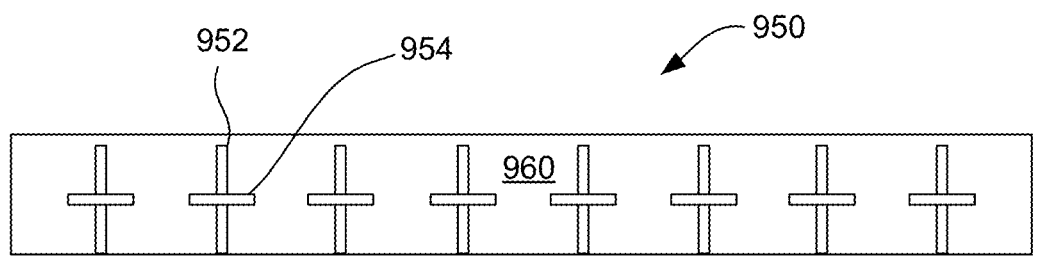
FIG. 9A shows a cross-sectional schematic diagram of an example acoustic attenuator layer including a plurality of horizontal components each intersecting through one of a plurality of vertical components in a medium according to some implementations.
Figure 9B:
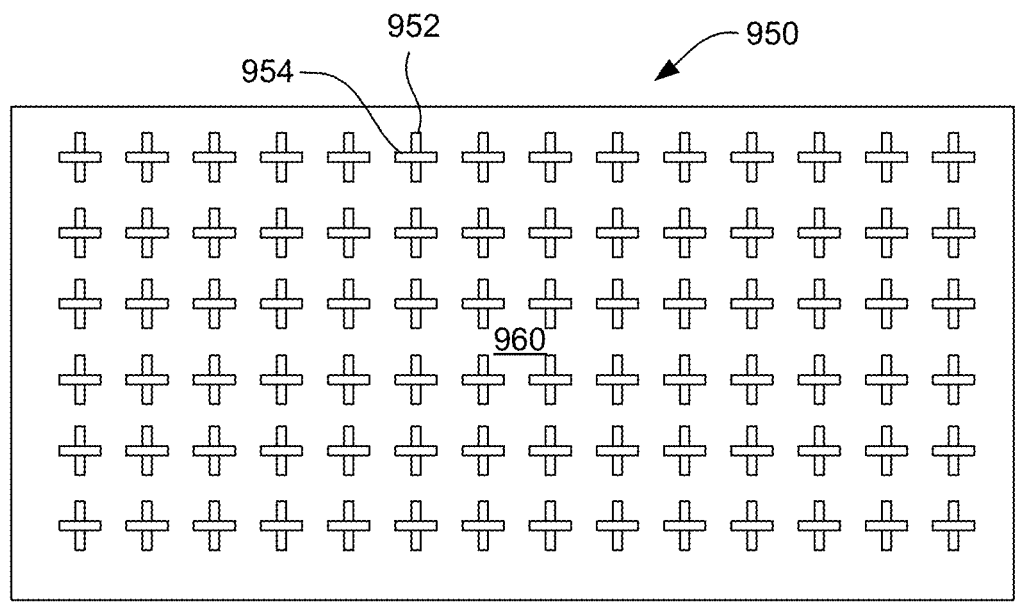
FIG. 9B shows a top view of the example acoustic attenuator layer of FIG. 9A according to some implementations.

FIG. 9A shows a cross-sectional schematic diagram of an example acoustic attenuator layer including a plurality of horizontal components each intersecting through one of a plurality of vertical components in a medium according to some implementations. FIG. 9B shows a top view of the example acoustic attenuator layer of FIG. 9A according to some implementations. The acoustic attenuator layer 950 includes a plurality of vertical components 952 and horizontal components 954 in a medium 960. Each of the horizontal components 954 intersects one of the vertical components 952 to form a "cross-shaped" structure. In such implementations, each horizontal component 954 intersects a portion between a top and bottom of one of the vertical components 952. Each of the horizontal components 954 is substantially parallel to a plane defining a major surface of the acoustic attenuator layer 950, and each of the vertical components 952 is substantially orthogonal to each of the horizontal components 954. In some implementations, a thickness of the acoustic attenuator layer 950 is between about 50 μm and about 500 μm.

In some implementations, the vertical components 952 and the horizontal components 954 can be formed from the same material. In some implementations, the vertical components 952 and the horizontal components 954 can be formed from different materials. The vertical components 952 and the horizontal components 954 can generally include any solid material, such as a metal, ceramic, or plastic.

The medium 960 can have an acoustic impedance different than an acoustic impedance of the plurality of vertical components 952 and the plurality of horizontal components 954. Characteristics of the medium 960 can be identical or similar to characteristics of the medium 760 in FIGS. 7A-7B or the medium 860 of FIGS. 8A-8B.

The plurality of vertical components 952 and horizontal components 954 may be spaced apart or separated from each other in a horizontal direction (e.g., length and/or width) of the acoustic attenuator layer 950. In some implementations, the plurality of vertical components 952 and horizontal components 954 are periodically spaced apart. In other words, each of the vertical components 952 and horizontal components 954 are uniformly spaced apart from each other. In some implementations, the plurality of vertical components 952 and horizontal components 954 form a plurality of geometric features or structures that are arranged as an array in the medium 960. In some implementations, the plurality of horizontal components 954 are periodically spaced apart by a distance between a quarter-wavelength and a half-wavelength of the ultrasonic wave. This can be measured with respect to any horizontal direction of the acoustic attenuator layer 950. In addition or in the alternative, the plurality of vertical components 952 are periodically spaced apart by a distance between a quarter-wavelength and a half-wavelength of the ultrasonic wave.

In some implementations, a horizontal distance (e.g., length) of the acoustic attenuator layer 950 can be between 1 mm and about 50 mm, and so several hundreds of vertical components 952 and horizontal components 954 may be periodically spaced apart in the medium 960 of the acoustic attenuator layer 950. Thus, more vertical components 952 and horizontal components 954 may be formed or otherwise disposed in the acoustic attenuator layer 950 than what is shown in FIGS. 9A and 9B.

The plurality of vertical components 952 are discontinuous across a thickness of the acoustic attenuator layer 950. Specifically, at least one gap exists for each of the plurality of vertical components 952 across a thickness of the acoustic attenuator layer 950. As shown in the implementation in FIG. 9A, a gap separates each vertical component 952 from a top of the acoustic attenuator layer 950. Without being limited by any theory, the gap from each of the vertical components 952 to the top of the acoustic attenuator layer 950 prevents the longitudinal waves from displacing or pushing all the way across the thickness of the acoustic attenuator layer 950.

Figure 9C:
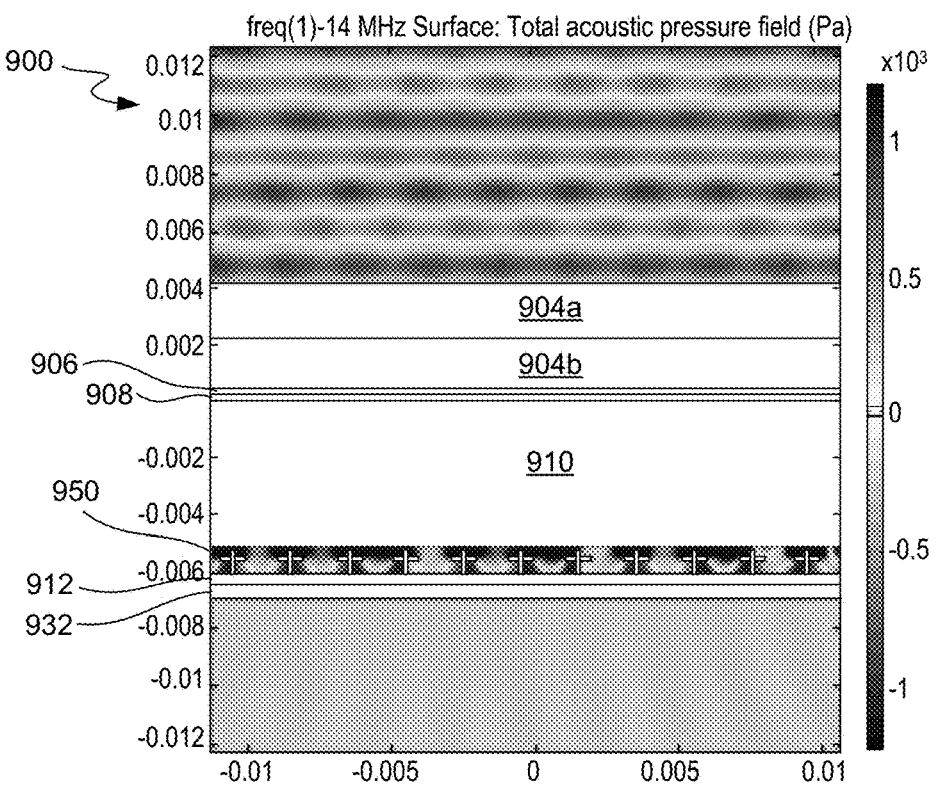
FIG. 9C shows an acoustic pressure field around an example stack of an ultrasonic fingerprint sensing system including the acoustic attenuator layer of FIG. 9A according to some implementations.
Figure 9D:
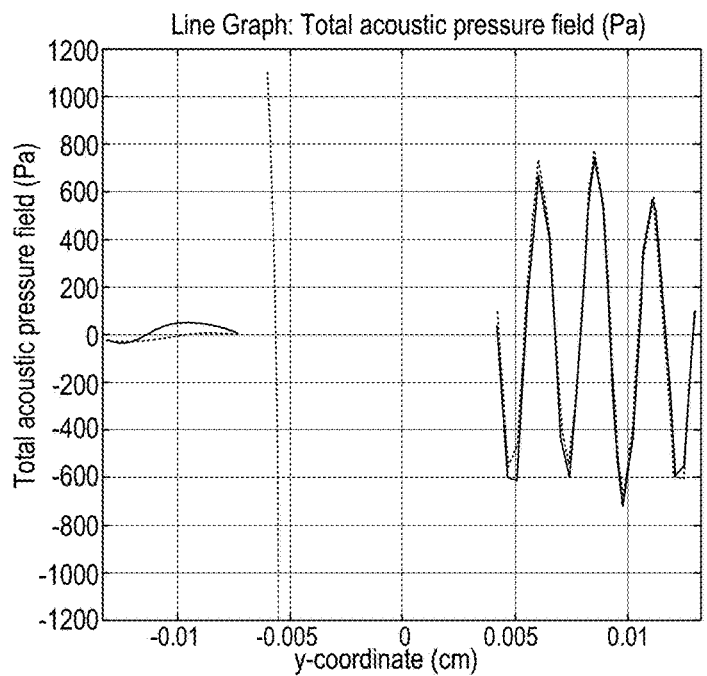
FIG. 9D shows a plot of the acoustic pressure field of the example stack of the ultrasonic fingerprint sensing system of FIG. 9C according to some implementations.

FIG. 9C shows an acoustic pressure field around an example stack of an ultrasonic fingerprint sensing system including the acoustic attenuator layer of FIG. 9A according to some implementations. FIG. 9D shows a plot of the acoustic pressure field of the example stack of the ultrasonic fingerprint sensing system of FIG. 9C according to some implementations. The plot in FIG. 9D measures total acoustic pressure along a y-direction of FIG. 9C, where the y-direction is the vertical direction of the stack 900. As shown in FIG. 9C, the stack 900 includes an ultrasonic transmitter layer 908, an electrically conductive layer 906 over the ultrasonic transmitter layer 908, and glass layers 904a, 904b over the electrically conductive layer 906. The stack 900 further includes an ultrasonic sensor layer 910 below the ultrasonic transmitter layer 908, an electromagnetic shielding layer 912 below the ultrasonic sensor layer 910, and a glass layer 932 below the electromagnetic shielding layer 912. Such layers below the ultrasonic sensor layer 910 may be referred to as backing layers of an electronic device or apparatus.

The acoustic attenuator layer 950 of FIG. 9A is between the electromagnetic shielding layer 912 and the ultrasonic sensor layer 910. In some implementations, the medium 960 of the acoustic attenuator layer 950 is air. The acoustic attenuator 950 absorbs and traps a substantial portion of the acoustic energy from the backward-propagating ultrasonic waves. In some implementations as shown in FIG. 9C, the backward-propagating ultrasonic waves are scattered using the horizontal components 954 and trapped within the vertical components 952. In some implementations as shown in FIG. 9D, a maximum magnitude of the acoustic pressure from the forward-propagating ultrasonic waves is at least 20 times greater than a maximum magnitude of the acoustic pressure from the backward-propagating ultrasonic waves.

FIGS. 7A-7D, 8A-8D, and 9A-9D show examples of acoustic attenuator layers with solid geometric features arranged in a medium. The solid geometric features may be periodically spaced apart in the medium. Such solid geometric features can include discontinuous vertical walls, mushroom-shaped structures, or cross-shaped structures. However, it will be understood that the present disclosure is not limited to the aforementioned solid geometric features, but can include other solid geometric shapes and structures arranged in a medium. For example, other solid geometric shapes can include triangular shapes, circular shapes, etc. In some implementations, the acoustic attenuator layer does not necessarily include a plurality of solid geometric features, but can include a plurality of holes arranged in a solid plate or sublayer. FIGS. 10A-10D show an example of an acoustic attenuator layer with circular holes arranged in a solid plate.

Figure 10A:
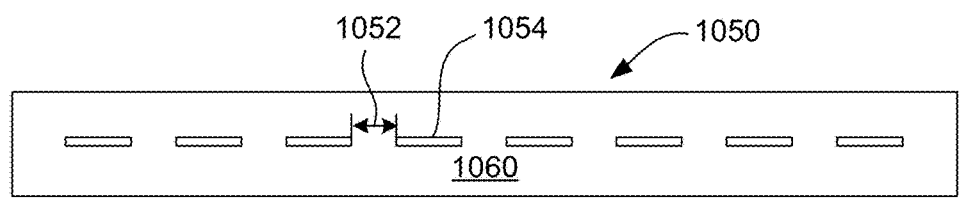
FIG. 10A shows a cross-sectional schematic diagram of an example acoustic attenuator layer including a plate having a plurality of holes in a medium according to some implementations.
Figure 10B:
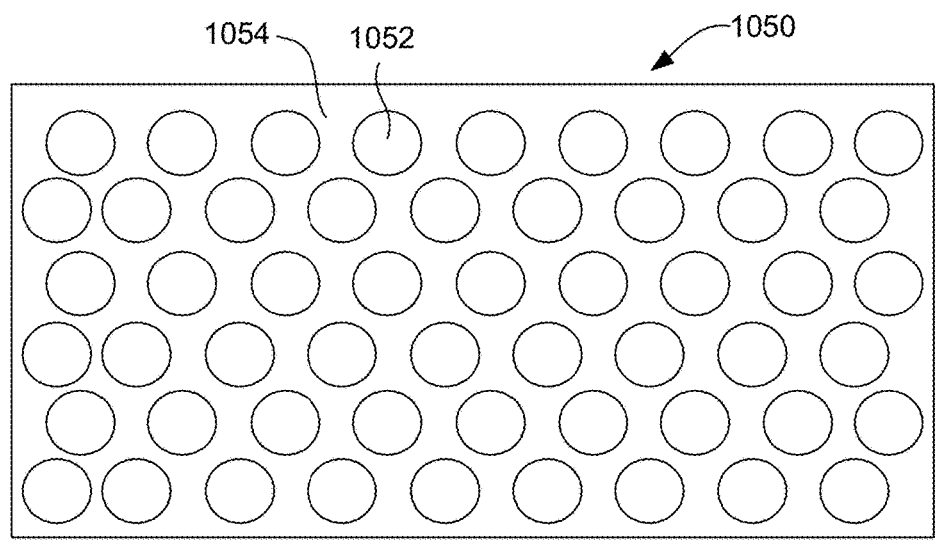
FIG. 10B shows a top view of the example acoustic attenuator layer of FIG. 10A according to some implementations.

FIG. 10A shows a cross-sectional schematic diagram of an example acoustic attenuator layer including a plate having a plurality of holes in a medium according to some implementations. FIG. 10B shows a top view of the example acoustic attenuator layer of FIG. 10A according to some implementations. The acoustic attenuator layer 1050 includes a plurality of holes 1052 arranged in a plate 1054. The holes 1052 can have any appropriate geometry, such as a circular geometry. The plate 1054 can be in a medium 1060 of the acoustic attenuator layer 1050. The plate 1054 can be substantially parallel to a plane defining a major surface of the acoustic attenuator layer 1050. In some implementations, the plate 1054 can span across the horizontal dimensions (e.g., length and width) of the acoustic attenuator layer 1050. Though not shown in FIGS. 10A and 10B, multiple plates 1054 can be arranged over one another in the acoustic attenuator layer 1050. Thus, the acoustic attenuator layer 1050 can include one or more plates 1054 in a medium 1060, each of the plates 1054 having a plurality of holes 1052. For example, the acoustic attenuator layer 1050 can include two, three, four, five, or ten plates 1054 in the medium 1060. In some implementations, a thickness of the acoustic attenuator layer 1050 is between about 50 μm and about 500 μm.

The plate 1054 in FIGS. 10A and 10B can be disposed in and surrounded by the medium 1060, where the medium 1060 has an acoustic impedance different than an acoustic impedance of the plate 1054. Therefore, a material of the medium 1060 is different than a material of the plate 1054. In some implementations, the medium 1060 can include any solid, liquid, or gaseous material, such as a metal, ceramic, plastic, or air. In some implementations, the medium 1060 includes air. That way, the holes 1052 and the medium 1060 are defined by air in the acoustic attenuator layer 1050. The material of the medium 1060 can provide a bulk or constitute a substantial portion of the material of the acoustic attenuator layer 1050.

The plurality of holes 1052 may be spaced apart or separated from each other in a horizontal direction of the acoustic attenuator layer 1050. In some implementations, the plurality of holes 1052 are periodically spaced apart. In other words, each of the holes 1052 is uniformly spaced apart from each other. In some implementations, the plurality of holes 1052 are periodically spaced apart by a distance between a quarter-wavelength and a half-wavelength of the ultrasonic wave. This can be measured with respect to any horizontal direction of the acoustic attenuator layer 1050. In some implementations, a diameter of the holes 1052 can be between 20 μm and 500 μm.

In some implementations, a horizontal distance (e.g., length) of the acoustic attenuator layer 1050 can be between 1 mm and about 50 mm, and so several hundreds of holes 1052 may be periodically spaced apart in the plate 1054. Thus, more holes 1052 may be formed or otherwise disposed in the acoustic attenuator layer 1050 than what is shown in FIGS. 10A and 10B.

The plate 1054 may be discontinuous across a thickness of the acoustic attenuator layer 1050. Specifically, a thickness of the plate 1054 does not span across a thickness of the acoustic attenuator layer 1050. As shown in the implementation in FIG. 10A, the medium 1060 separates the plate 1054 from one or both of a top and bottom of the acoustic attenuator layer 1050. For example, a medium 1060 of air can separate the plate 1054 from both an underlying layer of the acoustic attenuator layer 1050 and an overlying layer of the acoustic attenuator layer 1050 by a gap. Without being limited by any theory, a gap in the medium 1060 between the plate 1054 and the top and/or bottom of the acoustic attenuator layer 1050 prevents longitudinal waves from displacing or pushing all the way across the thickness of the acoustic attenuator layer 1050.

Figure 10C:
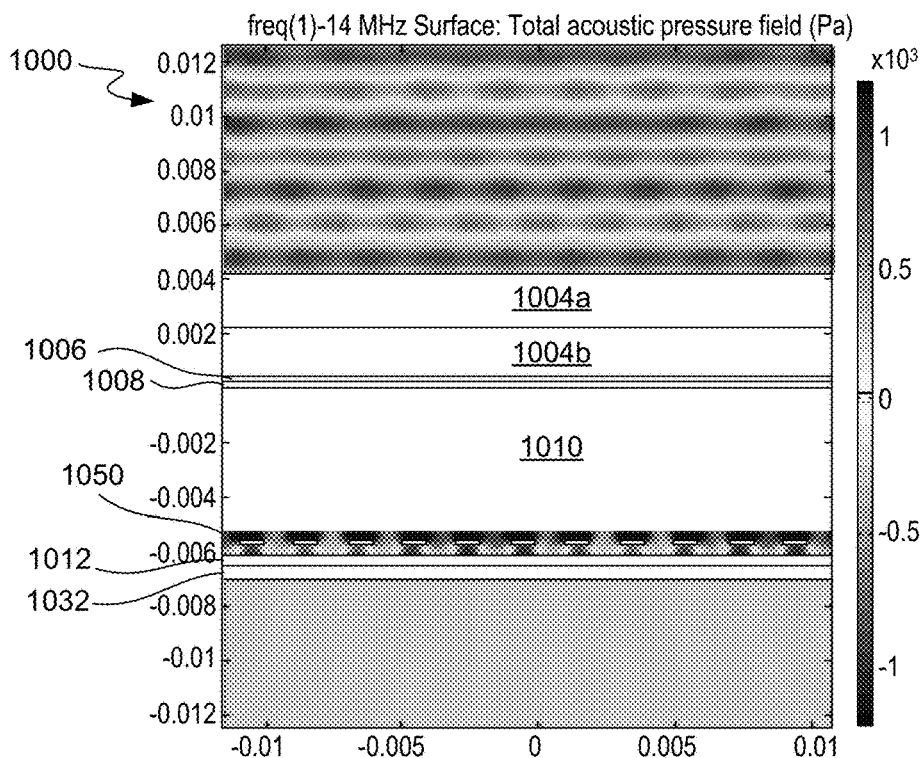
FIG. 10C shows an acoustic pressure field around an example stack of an ultrasonic fingerprint sensing system including the acoustic attenuator layer of FIG. 10A according to some implementations.
Figure 10D:
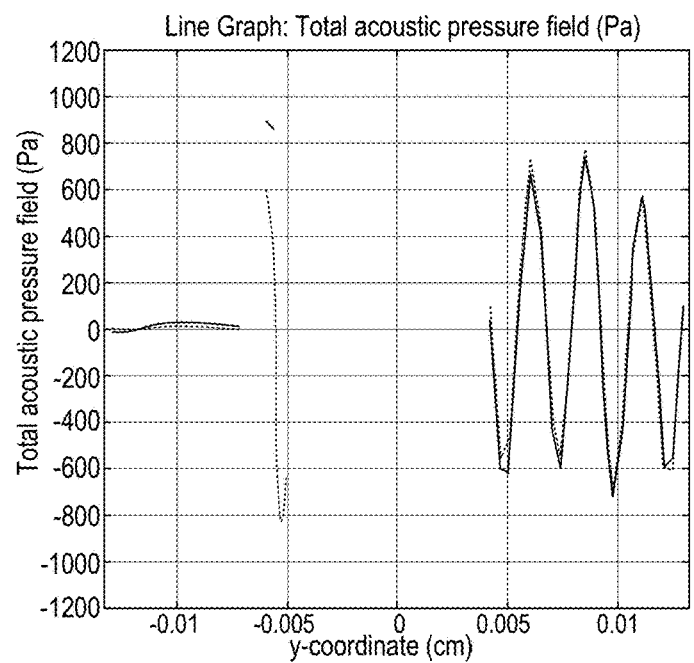
FIG. 10D shows a plot of the acoustic pressure field of the example stack of the ultrasonic fingerprint sensing system of FIG. 10C according to some implementations.

FIG. 10C shows an acoustic pressure field around an example stack of an ultrasonic fingerprint sensing system including the acoustic attenuator layer of FIG. 10A according to some implementations. FIG. 10D shows a plot of the acoustic pressure field of the example stack of the ultrasonic fingerprint sensing system of FIG. 10C according to some implementations. The plot in FIG. 10D measures total acoustic pressure along a y-direction of FIG. 10C, where the y-direction is the vertical direction of the stack 1000. As shown in FIG. 10C, the stack 1000 includes an ultrasonic transmitter layer 1008, an electrically conductive layer 1006 over the ultrasonic transmitter layer 1008, and glass layers 1004a, 1004b over the electrically conductive layer 1006. The stack 1000 further includes an ultrasonic sensor layer 1010 below the ultrasonic transmitter layer 1008, an electromagnetic shielding layer 1012 below the ultrasonic sensor layer 1010, and a glass layer 1032 below the electromagnetic shielding layer 1012. Such layers below the ultrasonic sensor layer 1010 may be referred to as backing layers of an electronic device or apparatus.

The acoustic attenuator layer 1050 of FIG. 10A is between the electromagnetic shielding layer 1012 and the ultrasonic sensor layer 1010. In some implementations, the medium 1060 of the acoustic attenuator layer 1050 is air. The acoustic attenuator layer 1050 absorbs and traps a substantial portion of the acoustic energy from the backward-propagating ultrasonic waves. In some implementations as shown in FIG. 10C, the backward-propagating ultrasonic waves are refracted and scattered in random motions or cancel one another. In some implementations as shown in FIG. 10D, a maximum magnitude of the acoustic pressure from the forward-propagating ultrasonic waves is at least 20 times greater than a maximum magnitude of the acoustic pressure from the backward-propagating ultrasonic waves.

FIGS. 7A-7D, 8A-8D, 9A-9D, and 10A-10D show examples of acoustic attenuator layers with geometric features or holes arranged in a medium. The geometric features or holes may be periodically spaced apart in the medium.

Figure 11A:
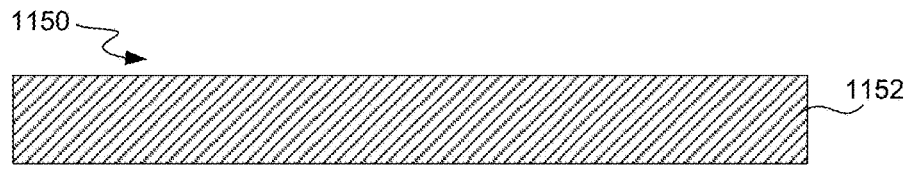
FIG. 11A shows a cross-sectional schematic diagram of an example acoustic attenuator layer including a bulk inhomogeneous material.
Figure 11B:
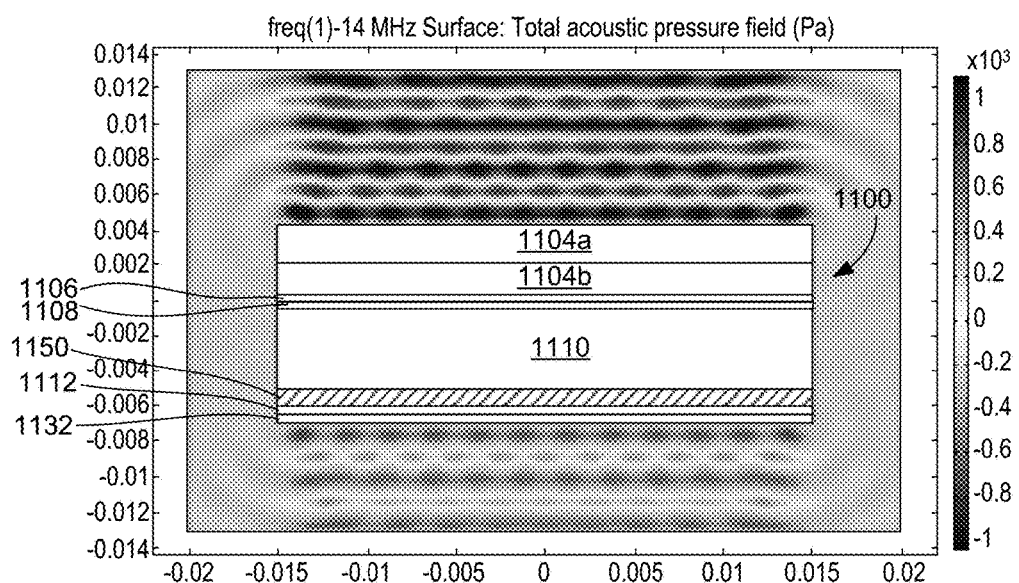
FIG. 11B shows an acoustic pressure field around an example stack of an ultrasonic fingerprint sensing system including the acoustic attenuator layer of FIG. 11A according to some implementations.
Figure 11C:
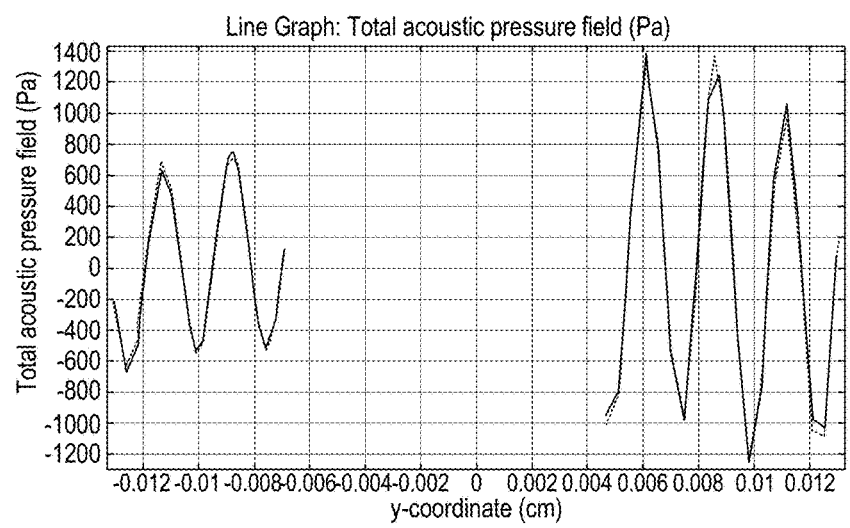
FIG. 11C shows a plot of the acoustic pressure field of the example stack of the ultrasonic fingerprint sensing system of FIG. 11B according to some implementations.
Figure 12A:
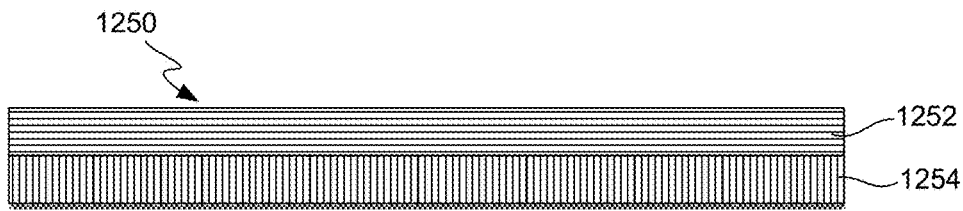
FIG. 12A shows a cross-sectional schematic diagram of an example acoustic attenuator layer including multiple sublayers of different materials according to some implementations.
Figure 12B:
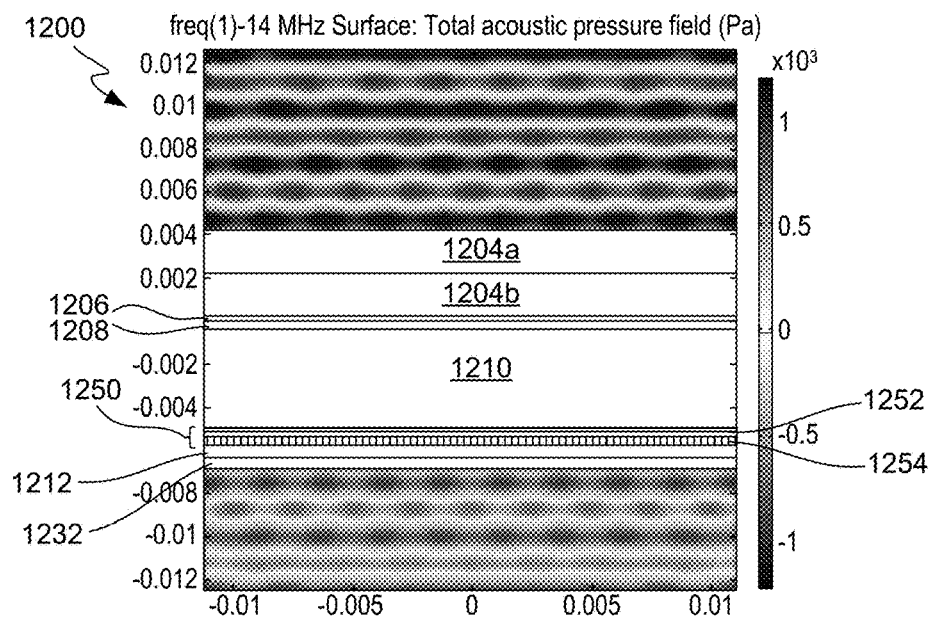
FIG. 12B shows an acoustic pressure field around an example stack of an ultrasonic fingerprint sensing system including the acoustic attenuator layer of FIG. 12A according to some implementations.
Figure 12C:
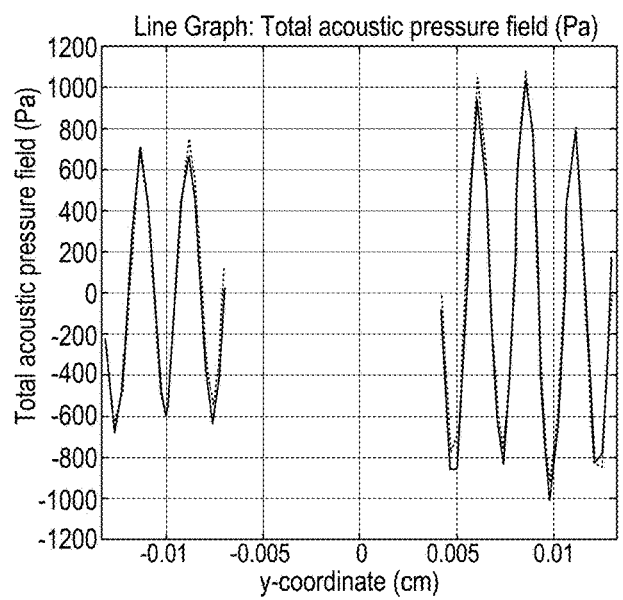
FIG. 12C shows a plot of the acoustic pressure field of the example stack of the ultrasonic fingerprint sensing system of FIG. 12B according to some implementations.

Such geometric features or holes can include discontinuous vertical walls, mushroom-shaped structures, cross-shaped structures, and holes in a plate. However, it will be understood that the present disclosure is not limited to the aforementioned geometric features or holes, but can include any suitable geometric shapes, holes, and structures arranged in a medium. In some implementations, the acoustic attenuator layer does not necessarily include a plurality of geometric features or holes in a medium, but can include a single inhomogeneous layer or multiple layers configured to attenuate ultrasonic waves. FIGS. 11A-11C show an example of an acoustic attenuator layer with a bulk inhomogeneous layer and FIGS. 12A-12C show an example of an acoustic attenuator layer with multiple sublayers of different materials.

FIG. 11A shows a cross-sectional schematic diagram of an example acoustic attenuator layer including a bulk inhomogeneous material. Instead of forming a plurality of geometric features in a medium, the acoustic attenuator layer 1150 can consist of a bulk inhomogeneous layer 1152. The bulk inhomogeneous layer 1152 may provide ease of fabrication for an acoustic attenuator layer 1150. The bulk inhomogeneous layer 1152 can include a material having an acoustic impedance that is substantially different than surrounding materials. The term "substantially different" with respect to acoustic impedance throughout this disclosure refers to an acoustic impedance value that is at least ten times greater or ten times less than an acoustic impedance of an adjacent surrounding material. For example, the acoustic attenuator layer 1150 can consist of a bulk inhomogeneous layer 1152 having an acoustic impedance that is substantially different than an overlying layer, such as an ultrasonic sensor layer. In some implementations, a thickness of the acoustic attenuator layer 1150 is between about 50 µm and about 500 µm The bulk inhomogeneous material can include any suitable solid material, such as a metal, ceramic, or plastic, with an acoustic impedance substantially different than surrounding materials. The bulk inhomogeneous material has spatial variation with respect to one or more material properties. In some implementations, the bulk inhomogeneous material has spatial variation with respect to elasticity, density, or speed of sound. This spatial variation can be expressed as a tensor:

$$e = \begin{bmatrix} m_{xx} & m_{xy} & m_{xz} \\ m_{yx} & m_{yy} & m_{yz} \\ m_{zx} & m_{zy} & m_{zz} \end{bmatrix}$$

For example, an elasticity of a material may vary depending on the direction of the ultrasonic wave propagating in a medium. In particular, an ultrasonic wave propagating in the xy plane direction sees a different elasticity than an ultrasonic wave propagating in the yz plane direction.

FIG. 11B shows an acoustic pressure field around an example stack of an ultrasonic fingerprint sensing system including the acoustic attenuator layer of FIG. 11A according to some implementations. FIG. 11C shows a plot of the acoustic pressure field of the example stack of the ultrasonic fingerprint sensing system of FIG. 11B according to some implementations. The plot in FIG. 11C measures total acoustic pressure along a y-direction of FIG. 11B, where the y-direction is the vertical direction of the stack 1100. As shown in FIG. 11B, the stack 1100 includes an ultrasonic transmitter layer 1108, an electrically conductive layer 1106 over the ultrasonic transmitter layer 1108, and glass layers 1104a, 1104b over the electrically conductive layer 1106. The stack 1100 further includes an ultrasonic sensor layer 1110 below the ultrasonic transmitter layer 1108, an electromagnetic shielding layer 1112 below the ultrasonic sensor layer 1110, and a glass layer 1132 below the electromagnetic shielding layer 1112. Such layers below the ultrasonic sensor layer 1110 may be referred to as backing layers of an electronic device or apparatus.

The acoustic attenuator layer 1150 of FIG. 11A is between the electromagnetic shielding layer 1112 and the ultrasonic sensor layer 1110. In some implementations, the bulk inhomogeneous layer 1152 has spatial variation in terms of elasticity, density, or speed of sound. The acoustic attenuator layer 1150 attenuates at least some of the acoustic energy from the backward-propagating ultrasonic waves. In some implementations as shown in FIG. 11C, a maximum magnitude of the acoustic pressure from the backward-propagating ultrasonic waves is less than a maximum magnitude of the acoustic pressure from the forward-propagating ultrasonic waves.

FIG. 12A shows a cross-sectional schematic diagram of an example acoustic attenuator layer including multiple sublayers of different materials according to some implementations. Instead of forming a plurality of geometric features in a medium, the acoustic attenuator layer 1250 can include a plurality of sublayers 1252, 1254, where the sublayers 1252, 1254 include different materials. Sublayers 1252, 1254 may provide ease of fabrication for an acoustic attenuator layer 1250. One or both of the sublayers 1252, 1254 can include a material having an acoustic impedance that is substantially different than surrounding materials. For example, the sublayer 1254 can include a material having an acoustic impedance that is different than the sublayer 1252, and the sublayer 1252 can include a material having an acoustic impedance that is substantially different than an overlying layer, such as an ultrasonic sensor layer. In some implementations, a thickness of the acoustic attenuator layer 1250 is between about 50 µm and about 500 µm Each of the sublayers 1252, 1254 can include any suitable solid material, such as a metal, ceramic, or plastic, where at least one of the sublayers 1252, 1254 has an acoustic impedance substantially different than surrounding materials. In some implementations, the sublayer 1252 can include alumina and the sublayer 1254 can include polysilicon. In some implementations, each of the sublayers 1252, 1254 can include a material that is inhomogeneous, meaning that the material has spatial variation with respect to one or more material properties. In some implementations, the acoustic attenuator layer 1250 can include more than two sublayers of different materials.

FIG. 12B shows an acoustic pressure field around an example stack of an ultrasonic fingerprint sensing system including the acoustic attenuator layer of FIG. 12A according to some implementations. FIG. 12C shows a plot of the acoustic pressure field of the example stack of the ultrasonic fingerprint sensing system of FIG. 12B according to some implementations. The plot in FIG. 12C measures total acoustic pressure along a y-direction of FIG. 12B, where the y-direction is the vertical direction of the stack 1200. As shown in FIG. 12B, the stack 1200 includes an ultrasonic transmitter layer 1208, an electrically conductive layer 1206 over the ultrasonic transmitter layer 1208, and glass layers 1204a, 1204b over the electrically conductive layer 1206. The stack 1200 further includes an ultrasonic sensor layer 1210 below the ultrasonic transmitter layer 1208, an electromagnetic shielding layer 1212 below the ultrasonic sensor layer 1210, and a glass layer 1232 below the electromagnetic shielding layer 1212. Such layers below the ultrasonic sensor layer 1210 may be referred to as backing layers of an electronic device or apparatus.

The acoustic attenuator layer 1250 of FIG. 12A is between the electromagnetic shielding layer 1212 and the ultrasonic sensor layer 1210. In some implementations, the acoustic attenuator layer 1250 includes at least two sublayers 1252, 1254 of different materials. The acoustic attenuator layer 1250 attenuates at least some of the acoustic energy from the backward-propagating ultrasonic waves. In some implementations as shown in FIG. 12C, a maximum magnitude of the acoustic pressure from the backward-propagating ultrasonic waves is less than a maximum magnitude of the acoustic pressure from the forward-propagating ultrasonic waves.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus comprising:
an ultrasonic sensor layer;
an ultrasonic transmitter layer over the ultrasonic sensor layer and having a piezoelectric material configured to generate ultrasonic waves;
a backing layer underlying the ultrasonic sensor layer, the backing layer including a material with an acoustic impedance different from that of the ultrasonic sensor layer; and
an acoustic attenuator layer between the ultrasonic sensor layer and the backing layer, wherein the acoustic attenuator layer includes a plurality of features periodically spaced apart in a medium, wherein each of the features includes a solid vertical component and a solid horizontal component, wherein a gap separates each solid horizontal component from a top of the acoustic attenuator layer and separates each solid vertical component from the top of the acoustic attenuator layer, the solid horizontal component intersecting the solid vertical component.

2. The apparatus of claim 1, wherein the solid vertical component and the solid horizontal component comprise different material.

3. The apparatus of claim 1, wherein the plurality of features includes a plurality of periodically spaced apart solid vertical components and periodically spaced apart solid horizontal components, each of the solid vertical components being discontinuous across a thickness of the acoustic attenuator layer.

4. The apparatus of claim 1, wherein the solid horizontal component intersects a portion between a top and bottom of the solid vertical component.

5. The apparatus of claim 1, wherein the solid horizontal component intersects a top of the solid vertical component.

6. The apparatus of claim 1, wherein the plurality of features include a plurality of solid vertical components that are periodically spaced apart in a horizontal direction by a distance between a quarter-wavelength and a half-wavelength of the ultrasonic waves.

7. The apparatus of claim 1, wherein the medium includes at least one of a metal, ceramic, plastic, and air, the medium having an acoustic impedance different from that of the plurality of features.

8. The apparatus of claim 1, wherein the acoustic attenuator layer is configured to absorb or at least attenuate ultrasonic waves.

9. The apparatus of claim 1, wherein a thickness of the acoustic attenuator layer is between about 50 μm and about 500 μm.

10. The apparatus of claim 1, wherein the ultrasonic sensor layer includes:
a thin film transistor (TFT) substrate; and
an array of thin film transistor (TFT) pixel circuits disposed on the TFT substrate.

11. The apparatus of claim 1, further comprising:
a control system coupled to the ultrasonic sensor layer, the control system configured to:
receive fingerprint sensor data from the ultrasonic sensor layer; and
extract fingerprint data from the fingerprint sensor data, the fingerprint data corresponding to fingerprints of a user's hand.

12. A mobile device comprising:
a platen; and
an ultrasonic fingerprint sensor system underlying the platen, the ultrasonic fingerprint sensor system including:
an ultrasonic transmitter layer including a piezoelectric material configured to generate ultrasonic waves;
an ultrasonic sensor layer underlying the ultrasonic transmitter layer; and
an acoustic attenuator layer underlying the ultrasonic sensor layer, wherein the acoustic attenuator layer includes: a plurality of periodically spaced apart features in a medium, wherein each of the features includes a solid vertical component and a solid horizontal component, wherein a gap separates each solid horizontal component from a top of the acoustic attenuator layer and separates each solid vertical component from the top of the acoustic attenuator layer, the solid horizontal component intersecting the solid vertical component.

13. The mobile device of claim 12, wherein the ultrasonic fingerprint sensor system further includes:
a backing layer underlying the acoustic attenuator layer, wherein the backing layer includes a material with an acoustic impedance different from that of the ultrasonic sensor layer.

14. The mobile device of claim 12, wherein the acoustic attenuator layer is configured to absorb or at least attenuate ultrasonic waves.

* * * * *